US011378253B2

(12) United States Patent
Park et al.

(10) Patent No.: US 11,378,253 B2
(45) Date of Patent: Jul. 5, 2022

(54) DISPLAY WITH FINGERPRINT DETECTING SENSOR BELOW DISPLAY PANEL

(71) Applicant: ARCSOFT CORPORATION LIMITED, Hangzhou (CN)

(72) Inventors: Kwang Sue Park, Seoul (KR); Dong Wook Nam, Suwon-si (KR); Byung Il Min, Suwon-si (KR)

(73) Assignee: ARCSOFT CORPORATION LIMITED, Hangzhou (CN)

( * ) Notice: Subject to any disclaimer, the term of this patent is extended or adjusted under 35 U.S.C. 154(b) by 350 days.

(21) Appl. No.: 16/312,724

(22) PCT Filed: Jun. 28, 2017

(86) PCT No.: PCT/KR2017/006801
§ 371 (c)(1),
(2) Date: Dec. 21, 2018

(87) PCT Pub. No.: WO2018/004243
PCT Pub. Date: Jan. 4, 2018

(65) Prior Publication Data
US 2019/0228204 A1 Jul. 25, 2019

(30) Foreign Application Priority Data

Jun. 28, 2016 (KR) .................. 10-2016-0080996
Feb. 24, 2017 (KR) .................. 10-2017-0024892
(Continued)

(51) Int. Cl.
*F21V 5/02* (2006.01)
*G02B 5/04* (2006.01)
(Continued)

(52) U.S. Cl.
CPC .............. *F21V 5/02* (2013.01); *G02B 3/0006* (2013.01); *G02B 5/04* (2013.01); *G02B 5/045* (2013.01);
(Continued)

(58) Field of Classification Search
CPC ........ G02B 3/0006; G02B 5/045; G02B 5/04; G06K 9/00046; G06K 9/0004; G06K 9/00;
(Continued)

(56) References Cited

U.S. PATENT DOCUMENTS

2010/0098302 A1\* 4/2010 Shin ................... G06K 9/00906
382/124
2013/0034274 A1 2/2013 Wu et al.
(Continued)

FOREIGN PATENT DOCUMENTS

CN 104318205 A 1/2015
CN 107580709 A 1/2018
(Continued)

OTHER PUBLICATIONS

English translation of International Search Report from corresponding PCT Appln No. PCT/KR2017/006801, dated Oct. 26, 2017.

*Primary Examiner* — Allahyar Kasraian
(74) *Attorney, Agent, or Firm* — Kevin J. Carroll; Grossman, Tucker, Perreault & Pfleger PLLC

(57) ABSTRACT

A fingerprint sensor is disclosed. An embodiment according to an aspect of the present invention provides a display having a fingerprint recognition function. The display having a fingerprint recognition function may comprise: a display panel, which is disposed under a cover glass and allows rays to pass therethrough, the rays having various incident angles indicating ridges and troughs of a fingerprint that is in contact with the cover glass; and an image sensor
(Continued)

layer, which is disposed under the display panel and detects a ray to be detected in the rays having the various incident angles to generate a fingerprint image.

9 Claims, 15 Drawing Sheets

(30) Foreign Application Priority Data

Mar. 6, 2017 (KR) .................... 10-2017-0028320
Jun. 13, 2017 (KR) .................... 10-2017-0073771

(51) Int. Cl.
G06V 10/147 (2022.01)
G06V 40/13 (2022.01)
G06V 40/12 (2022.01)
G02B 3/00 (2006.01)
G09G 3/22 (2006.01)

(52) U.S. Cl.
CPC ........ *G06V 10/147* (2022.01); *G06V 40/1318* (2022.01); *G06V 40/1324* (2022.01); *G06V 40/1335* (2022.01); *G09G 3/22* (2013.01)

(58) Field of Classification Search
CPC ........... G06K 9/00026; G06K 9/00006; G06K 9/00013; G06K 9/0012; G09G 3/22; F21V 5/02
See application file for complete search history.

(56) References Cited

U.S. PATENT DOCUMENTS

| | | | |
|---|---|---|---|
| 2013/0119237 A1* | 5/2013 | Raguin | H01L 27/14601 250/208.1 |
| 2013/0120760 A1* | 5/2013 | Raguin | G06K 9/0004 356/612 |
| 2014/0133715 A1 | 5/2014 | Ballard et al. | |
| 2016/0078270 A1* | 3/2016 | Lee | G06K 9/001 382/125 |
| 2017/0147865 A1* | 5/2017 | Jensen | G06K 9/00087 |
| 2017/0270342 A1* | 9/2017 | He | G06F 21/32 |
| 2017/0286742 A1* | 10/2017 | Mackey | G06K 9/0008 |
| 2018/0036997 A1* | 2/2018 | Shimizu | G02B 5/02 |
| 2019/0362120 A1* | 11/2019 | Yeke Yazdandoost | H01L 27/14629 |

FOREIGN PATENT DOCUMENTS

| | | | |
|---|---|---|---|
| JP | 11-120324 | 4/1999 | |
| JP | 2001-236491 | 8/2001 | |
| JP | 2009-043138 | 2/2009 | |
| JP | 2010-231336 | 10/2010 | |
| KR | 10-2013-0016023 | 2/2013 | |
| KR | 10-2015-0131944 | 11/2015 | |
| KR | 10-2016-0048646 | 5/2016 | |
| WO | WO-02061667 A1 * | 8/2002 | ........... G06K 9/0002 |
| WO | 2016205832 A1 | 12/2016 | |

* cited by examiner

*US 11,378,253 B2*

DISPLAY WITH FINGERPRINT DETECTING SENSOR BELOW DISPLAY PANEL

TECHNICAL FIELD

The invention relates to a display.

BACKGROUND INFORMATION

Discussion of the Related Art

A fingerprint sensor captures an image of a fingerprint and converts the captured image into an electrical signal. In order to captures a fingerprint image, a conventional optical fingerprint sensor includes an optical system that irradiates a fingerprint with light to allow the fingerprint to reflect the light. However, since the optical system including a prism, a specular mirror, and a lens has generally a considerable volume, it is difficult to decrease the size of an electronic device including the optical fingerprint sensor.

On the other hand, the number of types of electronic devices and the number of electronic devices which have a fingerprint sensor attached thereto have increased like portable electronic devices such as mobile phones and tablets. In order to attach a fingerprint sensor to the front surface of an electronic device, it is necessary to expose a sensing portion of the fingerprint sensor in contact with a fingerprint to the outside. Accordingly, when the whole front surface of an electronic device is covered with a protective medium such as a glass cover or a transparent film in order to protect a display panel or due to its own design, it is difficult to attach a fingerprint sensor employing a capacitive method of sensing change in capacitance to the front surface of an electronic device. It is also difficult to locate the fingerprint sensor under a display panel.

SUMMARY

One embodiment of one aspect of the present invention provides a display capable of detecting fingerprint. The display includes a display panel that is disposed below a glass cover and transmits rays of light having a plurality of incidence angles and indicating ridges and valleys of a fingerprint which is in contact with the glass cover, and an image sensor layer that is disposed below the display panel, detects a detection-target ray of light from the rays of light having a plurality of incidence angles, and generate a fingerprint image.

In one embodiment, the image sensor layer may include a light selection structure configured for selecting the detection-target ray of light having a detection-target incidence angle from the rays of light having a plurality of incidence angles and an image sensor that is disposed below the light selection structure and generates the fingerprint image using the detection-target ray of light, wherein the display panel serves as a light source of the rays of light having a plurality of incidence angles.

In one embodiment, the image sensor may generate a plurality of sub fingerprint images, and the display panel may generate the rays of light having a plurality of incidence angles by sequentially turning on pixels in one direction.

In one embodiment, the image sensor may generate the finger print image, and the display panel may generate the rays of light having a plurality of incidence angles by simultaneously turning on pixels.

In one embodiment, the light selection structure may include a prism sheet that refracts the ray of light having a detection-target incidence angle from the rays of light having a plurality of incidence angles at a first angle, and microlens that is disposed below the prism sheet and refracts the ray of light refracted at the first angle at a second angle.

In one embodiment, the image sensor may include a light receiving portion that generates a pixel current corresponding to the ray of light refracted at the second angle, and the light receiving portion may be disposed on one side below the microlens.

In one embodiment, the prism sheet may include a plurality of first inclined surfaces and a plurality of second inclined surfaces that are alternately arranged to form a prism ridge and a prism valley, wherein the first inclined surfaces may refract the ray of light having a detection-target incidence angle from the rays of light having a plurality of incidence angles at a first angle, and wherein an inclination angle of the first inclined surfaces may be smaller than an inclination angle of the second inclined surfaces.

In one embodiment, the display may further include a light absorbing layer that is formed on the second inclined surfaces and absorbs incident rays of light.

In one embodiment, the display may further include a light absorbing layer that is formed between two microlenses and absorbs incident rays of light.

In one embodiment, the light selection structure may include a prism sheet that includes a plurality of first inclined surfaces and a plurality of second inclined surfaces that are alternately arranged to form a prism valley and refracts the ray of light having a detection-target incidence angle from the rays of light having a plurality of incidence angles at a first angle, and microlens that is disposed below the prism sheet and refracts the ray of light refracted at the first angle at a second angle, wherein a top end of each first inclined surface may be connected to a top end of a neighboring second inclined surface, and wherein a bottom end of each first inclined surface and a bottom end of a neighboring second inclined surface may be connected to both ends of a bottom surface extending horizontally.

In one embodiment, the display may further include an optical path extending layer that is disposed between the microlens and the image sensor.

In one embodiment, the display may further include a light absorbing layer that is formed laterally in the optical path extending layer and in which openings through which the ray of light having a detection-target incidence angle passes are formed.

In one embodiment, the light selection structure may include a prism sheet that refracts the ray of light having a detection-target incidence angle from the rays of light having a plurality of incidence angles at a first angle, and a first microlens that is disposed below the prism sheet and refract the ray of light refracted at the first angle at a second angle. The image sensor may include a second microlens that is disposed on a top surface of the image sensor and that refracts the ray of light refracted at the second angle at a third angle.

In one embodiment, the image sensor layer may include a light selection structure configured for selecting a ray of light having a detection-target incidence angle, which is able to be taken by only rays of light reflected from the ridges, from the rays of light having a plurality of incidence angles, and an image sensor that is disposed below the light selection structure and generates a fingerprint image using the ray of light having a detection-target incidence angle.

In one embodiment, the rays of light having a plurality of incidence angles may be near-infrared rays of light.

In one embodiment, the display may further include a light source that emits the near-infrared rays of light.

In one embodiment, the display panel may emit the near-infrared rays of light.

In one embodiment, the image sensor may be formed of thin-film transistors and the image sensor layer is formed in at least a part or the whole of a bottom surface of the display panel.

One embodiment of another aspect of the present invention provides a fingerprint sensor package that is disposed below a display panel and generates a fingerprint image. The fingerprint sensor package may include a light selection structure configured for selecting a detection-target incidence angle which is able to be taken by only near-infrared rays of light reflected from ridges from a plurality of incidence angles, near-infrared rays of light reflected from ridges and valleys of a fingerprint formed on a finger skin, the near-infrared rays of light having the plurality of incidence angles, and an image sensor that is disposed below the light selection structure and generates a fingerprint image using the near-infrared ray of light having the detection-target incidence angle selected by the light selection structure.

In one embodiment, the fingerprint sensor package may further include a light source that emits the near-infrared rays of light toward the finger skin.

In one embodiment, the display panel may emit the near-infrared rays of light toward the finger skin.

In one embodiment, the light selection structure may include a prism sheet configured for selecting the detection-target ray of near-infrared light having a detection-target incidence angle from the rays of near-infrared light having a plurality of incidence angles, and microlens that is disposed below the prism sheet and refracts the ray of near-infrared light refracted at the first angle at a second angle. The image sensor may be disposed below the light selection structure, and include light receiving portion that generates a pixel current corresponding to the ray of near-infrared light refracted at the second angle. The light receiving portion may be disposed on one side below the microlens.

In one embodiment, the prism sheet may include a plurality of first inclined surfaces and a plurality of second inclined surfaces that are alternately arranged to form a prism ridge and a prism valley, the first inclined surfaces may refract the ray of near-infrared light having a detection-target incidence angle from the rays of near-infrared light having a plurality of incidence angles at a first angle. An inclination angle of the first inclined surfaces may be smaller than an inclination angle of the second inclined surfaces. The fingerprint sensor package may further include a light absorbing layer that is formed on the second inclined surfaces and absorbs incident rays of light.

In one embodiment, the fingerprint sensor package may further include a light absorbing layer that is formed between two microlenses and absorbs incident rays of light.

In one embodiment, the light selection structure may include a prism sheet configured for selecting the detection-target ray of near-infrared light having a detection-target incidence angle from the rays of near-infrared light having a plurality of incidence angles, and microlens that is disposed below the prism sheet and refracts the ray of near-infrared light refracted at the first angle at a second angle. A top end of each first inclined surface may be connected to a top end of a neighboring second inclined surface, and a bottom end of each first inclined surface and a bottom end of a neighboring second inclined surface are connected to both ends of a bottom surface extending horizontally. The fingerprint sensor package may further include an optical path extending layer that is disposed between the microlens and the image sensor. The optical path extending layer may further include a light absorbing layer that is formed laterally in the optical path extending layer and in which openings through which the ray of light having a detection-target incidence angle passes are formed.

In one embodiment, the light selection structure may include a prism sheet that refracts the ray of near-infrared light having a detection-target incidence angle from the rays of near-infrared light having a plurality of incidence angles at a first angle, and a first microlens that is disposed below the prism sheet and refract the ray of near-infrared light refracted at the first angle at a second angle, wherein the image sensor includes a second microlens that is disposed on a top surface of the image sensor and that refracts the ray of near-infrared light refracted at the second angle at a third angle.

One embodiment of still another aspect of the present invention provides a fingerprint sensor package that is disposed below a display panel and generates a fingerprint image. The fingerprint sensor package may include a light selection structure configured for selecting a ray of light having a detection-target incidence angle from rays of light having a plurality of incidence angles and indicating ridges and valleys of a fingerprint, and an image sensor that is disposed below the light selection structure and generates a fingerprint image using the ray of light selected by the light selection structure, wherein the fingerprint sensor package is disposed below the display panel and the rays of light having the plurality of incidence angles are generated by the display panel.

In one embodiment, the image sensor may generate a plurality of sub fingerprint images, and the display panel may generate the rays of light having a plurality of incidence angles by sequentially turning on pixels in one direction.

In one embodiment, the image sensor may generate the finger print image, and the display panel may generate the rays of light having a plurality of incidence angles by simultaneously turning on pixels.

In one embodiment, the light selection structure may include a prism sheet that refracts the ray of light having a detection-target incidence angle from the rays of light having a plurality of incidence angles at a first angle, and microlens that is disposed below the prism sheet and refracts the ray of light refracted at the first angle at a second angle.

In one embodiment, the image sensor may include a light receiving portion that generates a pixel current corresponding to the ray of light refracted at the second angle, and the light receiving portion may be disposed on one side below the microlens.

In one embodiment, the prism sheet may include a plurality of first inclined surfaces and a plurality of second inclined surfaces that are alternately arranged to form a prism ridge and a prism valley, and the first inclined surfaces may refract the ray of light having a detection-target incidence angle from the rays of light having a plurality of incidence angles at a first angle. An inclination angle of the first inclined surfaces may be smaller than an inclination angle of the second inclined surfaces.

In one embodiment, the prism sheet may further include a light absorbing layer that is formed on the second inclined surfaces and absorbs incident rays of light.

In one embodiment, the fingerprint sensor package may further include a light absorbing layer that is formed between two microlenses and absorbs incident rays of light.

In one embodiment, the light selection structure may include a prism sheet that includes a plurality of first inclined surfaces and a plurality of second inclined surfaces that are alternately arranged to form a prism valley and refracts the ray of light having a detection-target incidence angle from the rays of light having a plurality of incidence angles at a first angle, and microlens that is disposed below the prism sheet and refracts the ray of light refracted at the first angle at a second angle, wherein a top end of each first inclined surface may be connected to a top end of a neighboring second inclined surface, and wherein a bottom end of each first inclined surface and a bottom end of a neighboring second inclined surface may be connected to both ends of a bottom surface extending horizontally.

In one embodiment, the fingerprint sensor package may further include an optical path extending layer that is disposed between the microlens and the image sensor.

In one embodiment, the display may further include a light absorbing layer that is formed laterally in the optical path extending layer and in which openings through which the ray of light having a detection-target incidence angle passes are formed.

In one embodiment, the light selection structure may include a prism sheet that refracts the ray of light having a detection-target incidence angle from the rays of light having a plurality of incidence angles at a first angle, and a first microlens that is disposed below the prism sheet and refract the ray of light refracted at the first angle at a second angle. The image sensor may include a second microlens that is disposed on a top surface of the image sensor and that refracts the ray of light refracted at the second angle at a third angle.

BRIEF DESCRIPTION OF THE DRAWINGS

Hereinafter, embodiments of the invention will be described with reference to the accompanying drawings. For the purpose of easy understanding of the invention, the same elements will be referred to by the same reference signs. Configurations illustrated in the drawings are examples for describing the invention, and do not restrict the scope of the invention. Particularly, in the drawings, some elements are slightly exaggerated for the purpose of easy understanding of the invention. Since the drawings are used to easily understand the invention, it should be noted that widths, thicknesses, and the like of elements illustrated in the drawings might change at the time of actual implementation thereof. On the other hand, the same elements in the following detailed description of the invention will be referred to by the same reference signs, wherein.

DETAILED DESCRIPTION

Figure 1:
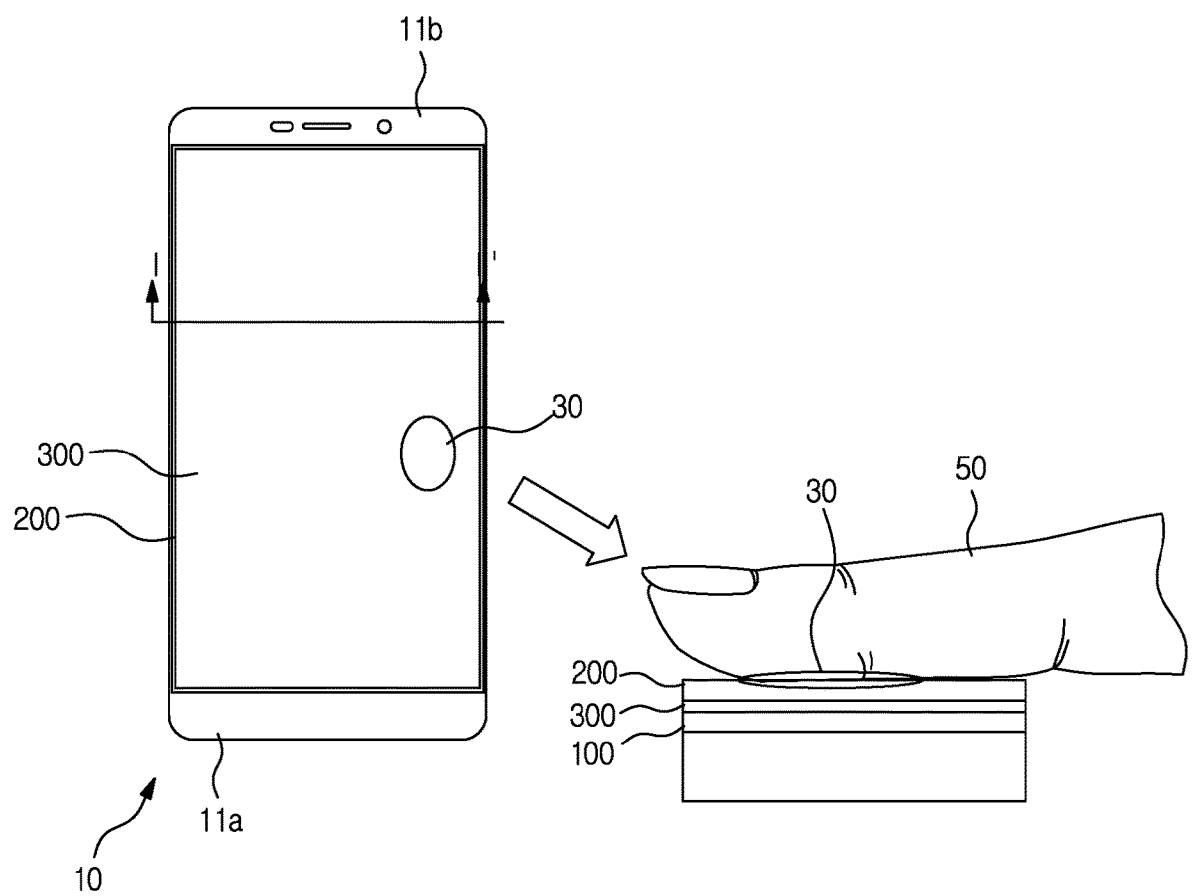
FIG. 1 is a diagram schematically illustrating a part of a display of an electronic device to which a display having a fingerprint recognition function is coupled.

Embodiments which will be described below with reference to the accompanying drawings can be implemented singly or in combination with other embodiments. Accordingly, it should be noted that the scope of the invention is not limited to the embodiments illustrated in the accompanying drawings.

On the other hand, among terms used in this specification, terms such as "substantially," "almost," and "about" are used to take consideration of a margin or an error at the time of actual embodiment. For example, "substantially 90 degrees" should be construed to include angles at which the same advantages as at 90 degrees can be expected. For example, "almost zero" should be construed to include a quantity which is slightly present but is ignorable.

On the other hand, unless otherwise mentioned, "side" or "horizontal" is used to mention a right-left direction in the drawings, and "vertical" is used to mention an up-down direction in the drawings. Unless otherwise defined, an angle, an incidence angle, and the like are defined with respect to a virtual straight line perpendicular to a horizontal plane illustrated in the drawings.

In the accompanying drawings, the same or similar elements will be referred to by the same reference numerals.

FIG. 1 is a diagram schematically illustrating a part of a display of an electronic device to which a display having a fingerprint recognition function is coupled.

FIG. 1 illustrates a smartphone in which a glass cover 200 is attached to the front surface thereof as an example of an electronic device 10. Upper and lower coated areas 11a and 11b that define areas for exposing a display panel 300 are formed on or below the bottom surface of the glass cover 200. On the other hand, right and left coated areas (not illustrated) may be connected to both ends of the upper and lower coated areas 11a and 11b depending on the type of the electronic device 10. The display panel 300 having a relatively large area and a speaker, a camera, and/or a sensor having a relatively small area can be disposed on the front surface of the electronic device 10. The glass cover 200 covers the entire display panel 300, or may cover a portion or the whole of the front surface of the electronic device 10 depending on the type of the electronic device 10. The display panel 300 is located below the glass cover 200, and an image sensor layer 100 is located below the display panel 300.

In one embodiment, light which is necessary for the display having a fingerprint recognition function to generate a fingerprint image is generated and applied to a finger by the display panel 300. Here, light may be, for example, visible rays of light, and the visible rays of light can be generated by R, G, and B pixels of the display panel 300. When a finger 50 is located in a fingerprint acquisition area 30 on the display panel 300 of the electronic device 10, light necessary for detecting a fingerprint is generated in the display panel 300. An example in which the display panel 300 applies light to the fingerprint acquisition area will be described below in detail with reference to FIGS. 2 to 4.

In another embodiment, light which is necessary for the display having a fingerprint recognition function to generate a fingerprint image may be, for example, near-infrared rays of light with a wavelength of 720 nm to 980 nm, and the near-infrared rays of light can be generated by IR pixels of the display panel 300. On the other hand, a light source that emits near-infrared rays of light may be disposed in the electronic device 10. The light source may be, for example, a light source with a high luminance such as an LED, a VCSEL, or a laser diode that emits near-infrared rays of light. One or more light sources may be disposed in a part of an edge area of the display panel 300. Reasons for using near-infrared rays of light instead of visible rays of light are: (1) near-infrared rays of light has a smaller decrease in visible rays of light due to the glass cover 200 and/or a polarization filter included in the display panel 300 than visible rays of light; (2) even when visible rays of light from the display panel 300 are reflected from the finger 50, interference therewith can be avoided because the wavelength of near-infrared rays of light is different from the wavelength of the visible rays of light; (3) most of visible rays of light do not diffuse easily in the skin of the finger 50 but near-infrared rays of light diffuse easily therein, and thus it is advantageous to use near-infrared rays of light as dot light sources; (4) since near-infrared rays of light are not easily recognized with human eyes, near-infrared rays of light do not affect a user's eyes even when near-infrared rays of light are used in the night time or in a dark place.

In still another embodiment, light generated inside the electronic device 10 passes through the glass cover 200 and is emitted to the outside. The light emitted to the outside is incident on the finger 50 and is incident on the glass cover 200 from the skin of the finger 50 again. Specifically, light incident on the skin of the finger 50 is incident on the inside of the glass cover 200 from ridges of the fingerprint which is in contact with the glass cover 200. On the other hand, light reflected from valleys which is not in contact with the glass cover 200 passes through air interposed between the skin and the glass cover 200 and then is incident on the inside of the glass cover 200.

In still another embodiment, the light source may not be driven in an environment in which near-infrared rays of light which are necessary for generating a fingerprint image are provided from ambient light, for example, in an environment such as a daytime of the summer. A light source driving circuit that drives the light source may be incorporated in the image sensor layer 100 or may be disposed in the electronic device 10. The light source driving circuit receives a measured value indicating surrounding brightness from an illuminance sensor of the electronic device 10 and checks whether an illuminance level of ambient light is equal to or higher that a level at which a fingerprint image which is generated by the image sensor layer 100 can be saturated. When the illuminance level of ambient light is equal to or higher than the level at which a fingerprint image can be saturated, the light source driving circuit may not drive the light source at the time of acquisition of a fingerprint image.

Another embodiment in which a fingerprint image is generated using near-infrared rays of light will be described below in detail with reference to FIG. 5.

FIGS. 2A to 2D are diagrams schematically illustrating an operation principle of the display having a fingerprint recognition function, where a part of the fingerprint acquisition area 30 illustrated in FIG. 1 is enlarged.

Figure 2A:
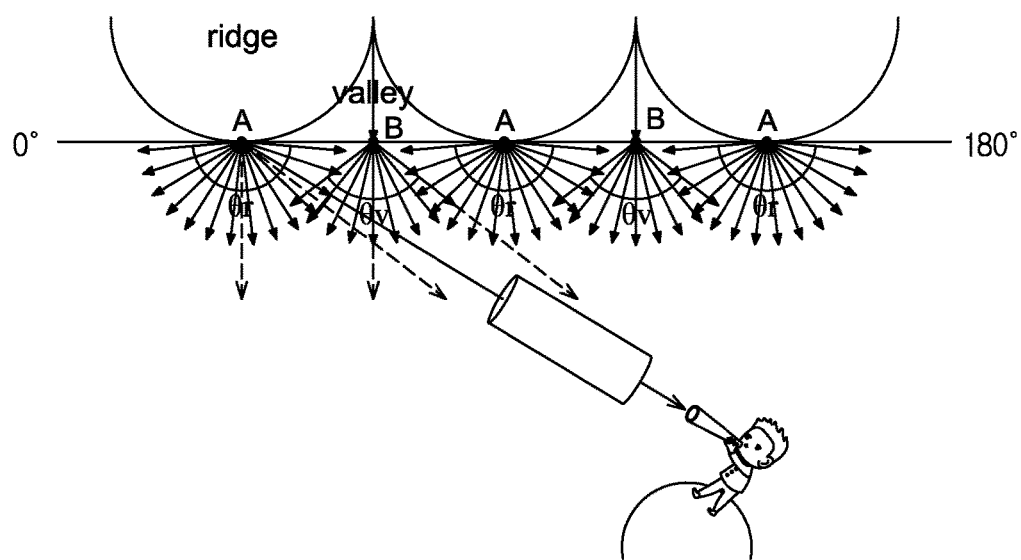
FIGS. 2A to 2D are diagrams schematically illustrating an operation principle of the display having a fingerprint recognition function.

Referring to FIG. 2A, the image sensor layer 100 has a structure in which only rays of light having a predetermined incidence angle out of rays of light incident on the image sensor layer 100 from ridges of a fingerprint arrive at the light receiving portions of the image sensor layer 100 and rays of light having angles other than the predetermined incidence angle do not arrive at the light receiving portions. That is, when rays of light is incident on the skin, the rays of light serve as infinite point light sources at the skin of the finger 50. When the finger is located on the glass cover 200, a part in contact with the glass cover 200 such as ridges of the fingerprint and a part not in contact with the glass cover 200 such as valleys of the fingerprint reflect rays of light having different incidence angles to the glass cover 200. Specifically, rays of light reflected from the valleys of the fingerprint passes through air interposed between the skin and the glass cover 200 and is then incident on the glass cover 200. Accordingly, the range of incident angles of the rays of light reflected from the valleys of the fingerprint is narrower than the range of incidence angles of rays of light reflected from the ridges of the fingerprint to the glass cover 200. A fingerprint image can be generated using rays of light having an incidence angle which are reflected from only the ridges of the fingerprint except for rays of light having the common range of incidence angles. This principle will be described below in detail with reference to FIGS. 2B to 2D.

Figure 2B:
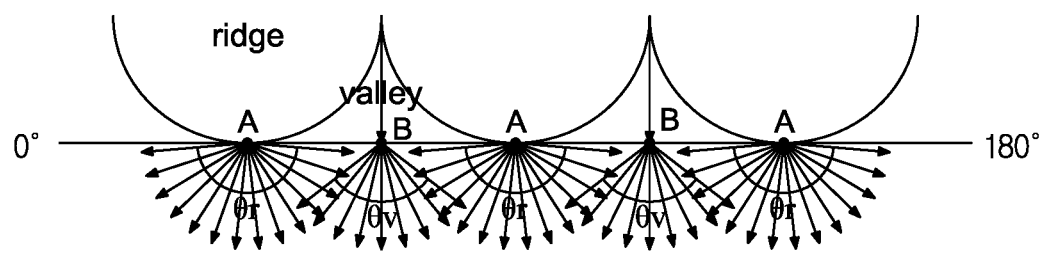

Referring to FIG. 2B, a fingerprint include ridges and valleys, the ridges come into contact with the top surface of the glass cover 200, and the valleys do not come into contact with the top surface of the glass cover 200. A protective medium is a near-infrared-transparent medium which can transmit near-infrared rays of light and prevents damage on the outer surface of the electronic device 10. An example of the protective medium is the glass cover 200 that is attached to the front surface of a mobile phone and protects the display panel 300. In the following description, it is assumed that the glass cover 200 is an example of the protective medium.

The ridges and the valleys of a fingerprint serve as multiple light sources that apply rays of light from the top surface of the glass cover 200 to the light receiving portions of the image sensor layer 100. Points A at which the ridges come in contact with the top surface of the glass cover 200 serve as light sources, emit rays of light in all directions, and applies rays of light from the top surface of the glass cover 200 to the inside of the glass cover 200. On the other hand, rays of light emitted from the valleys which are not in contact with the top surface of the glass cover 200 arrive at Points B on the top surface of the glass cover 200 through air between the valleys and the glass cover 200 and thus the rays of light are refracted at Points B. Accordingly, glass cover incidence angles $\theta_r$ of the rays of light which are incident on the glass cover 200 from Points A belong to a range of about 0 degrees to about 180 degrees, and glass cover incidence angles $\theta_v$ of the rays of light which are incident on the glass cover 200 from Points B belong to a relatively narrow range in comparison with the glass cover incidence angles $\theta_r$ due to a difference between a refractive index of air and a refractive index of the glass cover. Here, it is assumed that the glass cover incidence angle of rays of light directed to the left to be substantially parallel to the top surface of the glass cover 200 is 0 degrees, the glass cover incidence angle of rays of light which are incident on the top surface of the glass cover 200 to be substantially perpendicular thereto is 90 degrees, and the glass cover incidence angle of rays of light which are directed to the right to be substantially parallel to the top surface of the glass cover 200 is 180 degrees. Here, the angle of a ray of light which is incident on the glass cover 200 is defined as a glass cover incidence angle.

The image sensor layer 100 is formed on the bottom surface of the display panel 300. Unlike an LCD which requires an additional structure for generating rays of light such as a backlight or a reflecting film on the bottom surface of the display panel 300, an AMOLED or a quantum dot display does not require an additional structure because a unit pixel directly generates a ray of light. On the other hand, electrodes and/or wirings occupying a considerable portion of a unit pixel area of the display panel 300 are formed of optically transparent materials. Accordingly, the display panel 300 interposed between the glass cover 200 and the image sensor layer 100 can provide an extended optical path through which rays of light input from the glass cover 200 can pass. In other words, substantially the same results as those of forming the image sensor layer 100 on the bottom surface of a glass cover thicker than a general glass cover can be expected. As will be described below in detail, the image sensor layer 100 has a structure for selecting an incidence angle of a ray of light to be detected. Accordingly, even when a phenomenon in which rays of light input from the display panel 300 are refracted to a certain extent occurs, rays of light having a predetermined incident angle can be detected below the display panel 300 by adjusting one or more conditions for selecting an incidence angle of rays of light.

Figure 2C:
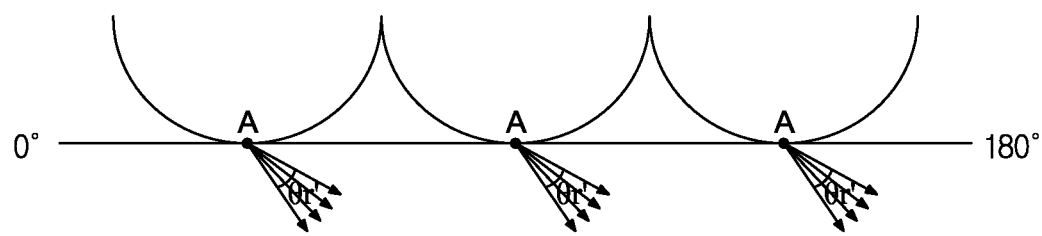
Figure 2D:
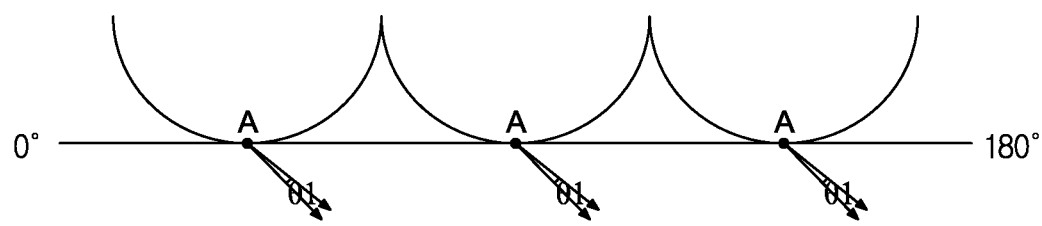

The image sensor layer 100 selects rays of light having a predetermined detection-target incidence angle $\theta_1$ out of rays of light which are incident on the top surface of the image sensor layer 100 through the glass cover 200 and the display panel 300. FIG. 2C illustrates rays of light having an incidence angle $\theta_{r'}$ which is selected by a light selection structure of the image sensor layer 100 out of rays of light incident on the top surface of the image sensor layer 100, and FIG. 2D illustrates rays of light having the detection-target incidence angle $\theta_1$ which finally arrive at the light receiving portions of the image sensor out of rays of light having the incidence angle $\theta_{r'}$. That is, the light selection structure of the image sensor layer 100 selects rays of light having a specific incidence angle by directing rays of light having a predetermined incidence angle to the bottom of the image sensor layer 100 at which the light receiving portions are located. In the following description, a ray of light having the detection-target incidence angle $\theta_1$ is referred to as a detection-target ray of light.

Specifically, in FIG. 2C, the light selection structure of the image sensor layer 100 blocks rays of light incident on the left sides of Points A and Points B out of rays of light incident on the image sensor layer 100 and additionally blocks rays of light having the same incidence angle as the incidence angle of rays of light incident on the right side of Points B out of rays of light incident on the right side of Points A. Accordingly, rays of light having the incidence angle $\theta_{r'}$ can be selected. For example, when a glass cover incidence angle $\theta_r$ belongs to a range of about 0 degrees to about 180 degrees and a glass cover incidence angle $\theta_v$ belongs to a range of about 42 degrees to about 132 degrees, the incidence angle $\theta_{r'}$ belongs to a range of about 132 degrees to about 140 degrees, which is merely an example and can vary depending on characteristics of the light selection structure.

In FIG. 2D, rays of light having the detection-target incidence angle $\theta_1$ to be incident on the light receiving portions can be selected out of rays of light selected by the light selection structure. For example, when the incidence angle $\theta_{r'}$ belongs to a range of 132 degrees to 140 degrees, the detection-target incidence angle $\theta_1$ belongs to a range of 125 degrees to 140 degrees, which is merely an example and can vary depending on characteristics of the light selection structure such as positions, diameters, and sizes of microlenses. Here, the rays of light having the detection-target incidence angle $\theta_1$ are refracted while passing through the light selection structure and the image sensor, and the angle $\theta r$ at the time of finally arriving at the light receiving portions can be different from the detection-target incidence angle $\theta_1$. In FIGS. 2C and 2D, a structure for blocking rays of light incident on the left of Points A and generating a fingerprint image is illustrated, and substantially the same fingerprint image can be generated with a structure for blocking rays of light incident on the right of Points A.

Since the detection-target incidence angle $\theta_1$ is an angle which can be taken by only rays of light generated from the ridges of the fingerprint, a clear fingerprint image can be generated using the detection-target incidence angle $\theta_1$. As illustrated in FIG. 2B, when the fingerprint is located on the glass cover 200, rays of light from the valleys in addition to rays of light from the ridges are incident on the glass cover. Since an optical fingerprint sensor according to the related art has a structure for detecting rays of light which are incident perpendicularly, rays of light which are incident substantially perpendicularly on the top surfaces of the light receiving portions from the valleys are detected in addition to rays of light which are incident substantially perpendicularly on the top surfaces of the light receiving portions from the ridges. Accordingly, a fingerprint image in which a boundary between a ridge and a valley of the fingerprint is not clear is generated. On the other hand, since the display having a fingerprint recognition function according to the invention has a structure for detecting only at least a portion of rays of light based on the ridges out of rays of light generated based on a contact surface of a fingerprint, it is possible to generate a clearer fingerprint image than the optical fingerprint sensor according to the related art does.

Figure 3:
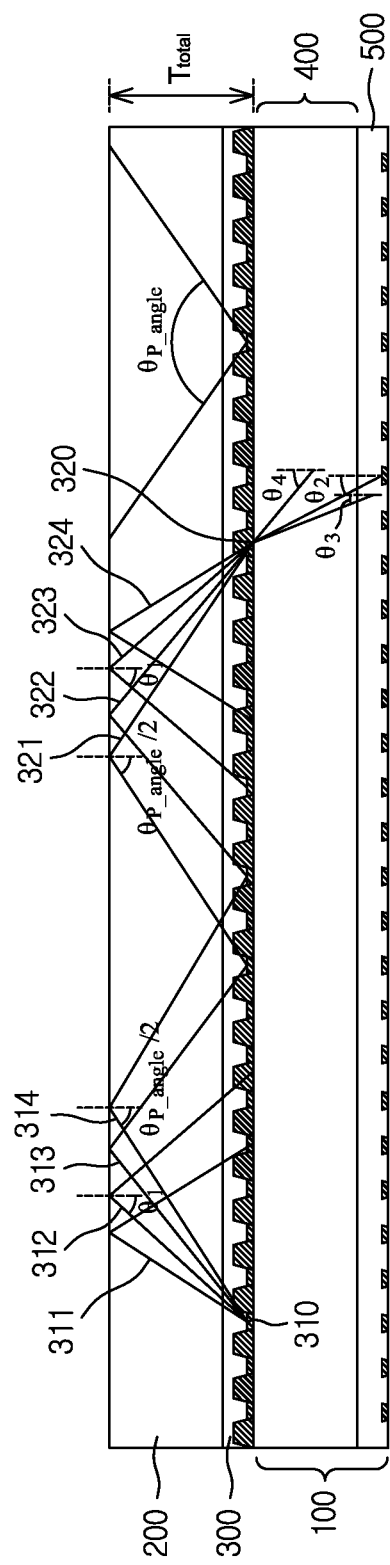
FIG. 3 is a sectional view illustrating the display having a fingerprint recognition function taken along line I-I' in FIG. 1.

FIG. 3 is a sectional view illustrating the display having a fingerprint recognition function taken along line I-I' in FIG. 1.

Referring to FIG. 3, the display having a fingerprint recognition function has a structure in which the display panel 300 and the image sensor layer 100 are stacked. A glass cover, a touch sensor, a polarization film, and the like (hereinafter collectively referred to as the glass cover 200) can be stacked on the display having a fingerprint recognition function. Since rays of light generated from the display panel 300 have to be emitted to the outside, the glass cover 200 is formed to be optically transparent.

The image sensor layer 100 includes a light selection structure 400 and an image sensor 500. The image sensor layer 100 is formed on at least a part or the whole area of the bottom surface of the display panel 300, and the image sensor layer 100 may have a flat panel shape like the display panel 300. The light selection structure 400 allows a detection-target ray of light to arrive at the image sensor 500 and prevent rays of light having the other incidence angles from arriving at the image sensor 500 or from being detected. The image sensor 500 includes thin film transistors (TFT), is disposed below the light selection structure 400, and serve to convert rays of light passing through the light selection structure 400 into a pixel current and to output the pixel current. The detection-target incidence angle and the detection-target ray of light will be described below.

A pixel 310 on the display panel 300 is turned on to apply rays of light 311, 312, 313, and 314 to the top surface of the glass cover 200. The rays of light 311, 312, 313, and 314 applied to the glass cover 200 can be inclined at an angle θ (≥0 degrees) equal to or less than a maximum angle $\theta_{P\_angle}$ which is determined by a pixel structure of the display panel 300. Some of the rays of light 311, 312, 313, and 314 applied to the glass cover 200 are transmitted or refracted by the top surface of the glass cover 200 to propagate to the outside, and the other of the rays of light 311, 312, 313, and 314 can be reflected by the top surface of the glass cover 200 and be incident on the display panel 300. Here, a reflection angle from the top surface of the glass cover 200 can be defined as θ and the reflection angle θ is substantially the same as an incidence angle on the image sensor layer 100. Accordingly, in the following description, the incidence angle on the image sensor layer 100 is also referred to as θ. The top surface of the glass cover 200 serves as an interface between the glass cover and the air and the intensity of rays of light propagating to the outside and the intensity of rays of light which are reflected and returned can vary before and after the total reflection angle $\theta_{fr}$ due to a difference in refractive index therebetween.

A distance between the position of the first pixel 310 and a ray of light returned to the display panel 300 can be determined depending on a total thickness $T_{total}$ which is the sum of the thickness of the glass cover 200 and the thickness of the display panel 300 and the glass cover reflection angle θ. That is, when the total thickness $T_{total}$ increases or the glass cover reflection angle θ increases, the distance between the position of the first pixel 310 and a ray of light returned to the display panel 300 can increase. For example, the detection-target incidence angle may be substantially the same as the total reflection angle $\theta_{fr}$. For example, the detection-target incidence angle may be greater or less than the total reflection angle $\theta_{fr}$.

Rays of light 321, 322, 323, and 324 having different optical paths are incident on the image sensor layer 100 through a second pixel 320. The rays of light 321, 322, 323, and 324 are generated from different pixels, are reflected at different glass cover reflection angles θ, and arrive at the second pixel 320. Here, the detection-target ray of light 323 having the detection-target incidence angle $\theta_1$ is adjusted to have an incidence angle $\theta_2$ by the light selection structure 400 and is then incident on the light receiving portion of the image sensor 500. On the other hand, the rays of light 321, 322, and 324 having different incidence angles $\theta(\neq\theta_1)$ are adjusted to have an incidence angle $\theta_3$ or $\theta_4$ by the light selection structure 400 and do not arrive at the light receiving portions of the image sensor 500.

Figure 4:
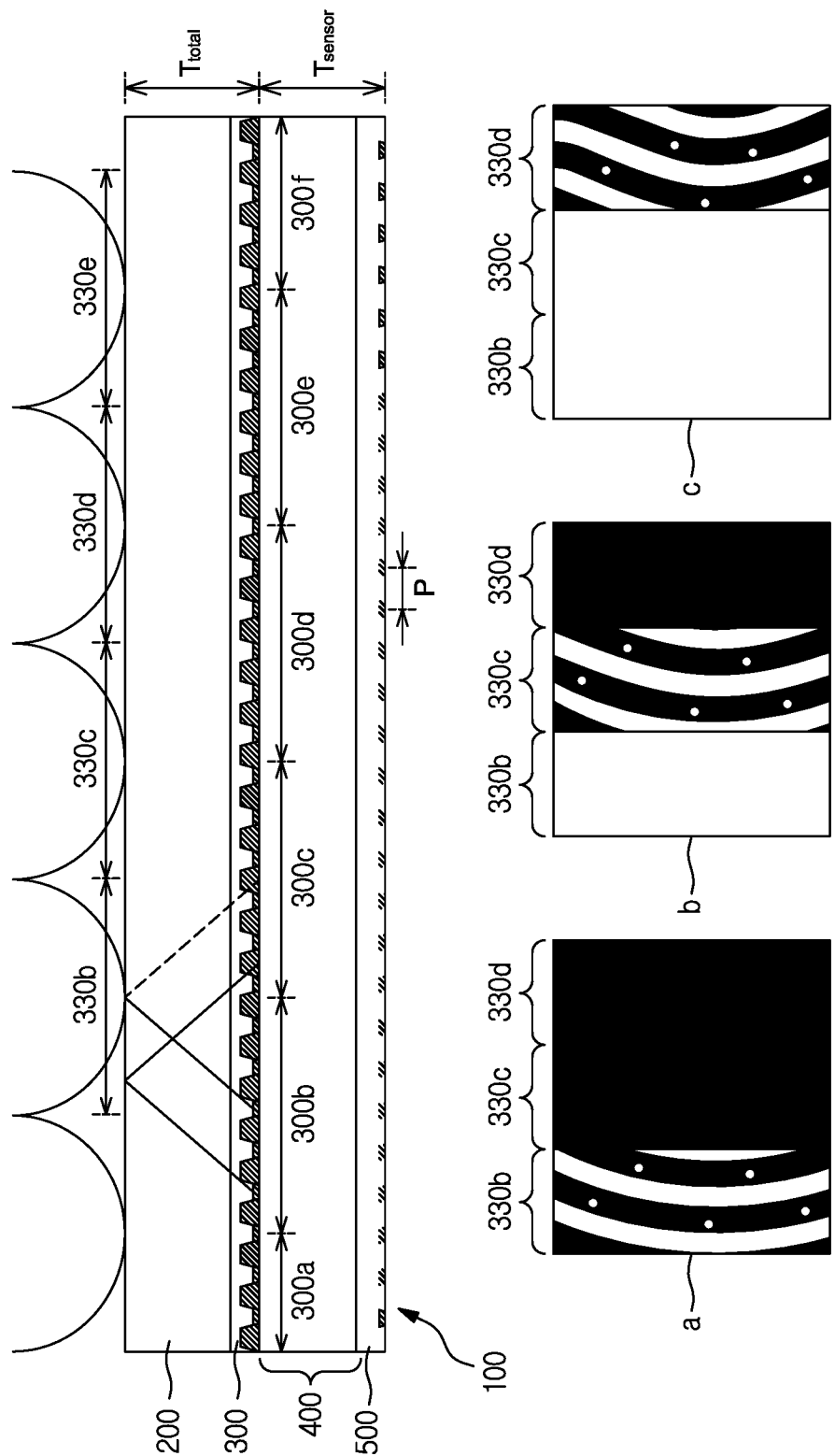
FIG. 4 is a sectional view illustrating an operation of the display having a fingerprint recognition function illustrated in FIG. 3.

FIG. 4 is a sectional view illustrating an operation of the display having a fingerprint recognition function illustrated in FIG. 3.

The display panel 300 can provide rays of light which are required for generating a fingerprint image by sequentially turning on pixels corresponding to a fingerprint acquisition area 30 in one direction or simultaneously turning on the pixels. Here, the fingerprint acquisition area 30 located on the top surface of the glass cover 200, a pixel area corresponding to the fingerprint acquisition area 30, and a light incidence area corresponding to the fingerprint acquisition area 30 have substantially the same planar shape and do not perfectly overlap each other. Specifically, rays of light generated from the display panel 300 are reflected by the top surface of the glass cover 200 and then are incident on the image sensor layer 100 through the light incidence area on the top surface thereof. Accordingly, in FIG. 4, a light generation point (the pixel area), a reflection point (the fingerprint acquisition area), and an incidence point (the light incidence area) differ in the horizontal direction. The distances between the points can be determined by the selected detection-target incidence angle $\theta_1$ and the total thickness $T_{total}$.

In order to enhance contrast between the valleys and the ridges of a fingerprint, the image sensor layer 100 detects rays of light which are substantially totally reflected from the top surface of the glass over 200. As described above with reference to FIG. 3, pixels of the display panel 300 emit rays of light at various angles. Rays of light incident perpendicularly on the glass cover 200 out of the rays of light with various angles are most reflected by a fingerprint and are incident perpendicularly on the image sensor layer 100. However, when rays of light incident perpendicularly to the image sensor layer 100 are used, a difference between a light intensity corresponding to the valleys of the fingerprint and a light intensity corresponding to the ridges is not large and it is thus difficult to acquire a clear fingerprint image. On the other hand, when rays of light reflected at the detection-target incidence angle which is substantially the same as the total reflection angle are used, the difference between a light intensity absorbed by the fingerprint and a light intensity not absorbed by the fingerprint is large and thus it is possible to acquire a clear fingerprint image. In order to enhance the contrast of rays of light reflected from the fingerprint and to prevent rays of light incident perpendicularly thereon from affecting acquisition of a fingerprint image, a sub pixel area which is located below the light incidence area on which the reflected rays of light are incident is turned off.

Referring to FIG. 4, the image sensor layer 100 has a structure that allows only a detection-target ray of light out of the rays of light indicating the ridges and the valleys of a fingerprint to arrive at the light receiving portions of the image sensor 500 and prohibits rays of light having angles other than the detection-target incidence angle from arriving at the light receiving portions of the image sensor 500. When a finger is located on the top surface of the glass cover 200, a part in which the ridges of the fingerprint are in contact with the top surface of the glass cover 200 and a part in which the ridges are not in contact with the glass cover are generated. The detection-target ray of light emitted from below the glass cover 200 is partially absorbed by the ridges and is totally reflected in the part of the top surface of the glass cover 200 with which the ridges are in contact. On the other hand, the rays of light emitted from below the glass cover 200 are totally reflected in the part of the top surface of the glass cover 200 which the ridges are not in contact. Accordingly, the image sensor 500 located in the lower part of the image sensor layer 100 generates a fingerprint image using the totally reflected detection-target ray of light. In the fingerprint image, the ridges are displayed as dark parts and the valleys are displayed as brighter parts than the ridges.

The display panel 300 can generate rays of light by sequentially turning on the pixels corresponding to the fingerprint acquisition area 30 in one direction. In FIG. 4, the fingerprint acquisition area 30 defined on the top surface of the glass cover 200 includes a plurality of sub fingerprint acquisition areas 330a, 330d, and 330e, and a pixel area corresponding to the fingerprint acquisition area 30 includes a plurality of sub pixel areas 300b, 300c, and 300d. Pixels located in each of the sub pixel areas 300b, 300c, and 300d can be simultaneously turned on or sequentially turned on from left to right. Turning on or off of the sub pixel areas 300b, 300c, and 300d can be controlled directly or indirectly, for example, by an application processor (AP) of the electronic device or a timing controller (TCON) of the display panel.

For example, band-like sub fingerprint images a, b, and c are illustrated in the lower part of FIG. 4. An area which is relatively bright and in which no fingerprint image is displayed is for easy understanding and indicates an area which is not used because the fingerprint image may be distorted by the display panel 300 that applies rays of light to the image sensor layer 100.

First, when the pixels belonging to the sub pixel area 300b are simultaneously turned on or sequentially turned from the left to the right, a detection-target ray of light is totally reflected by the sub fingerprint acquisition area 30b corresponding to the sub pixel area 300b. The totally reflected detection-target ray of light arrives at the sub pixel area 300c and is incident on the image sensor layer 100. At this time, other sub pixel areas 300c, 300d, 300e, and 300f located on the right side of the turned-on sub pixel area 300b can be turned off and, for example, at least the sub pixel area 300c adjacent to the turned-on sub pixel area 300b has to be turned off. On the other hand, the sub pixel area 300a located on the left side of the turned-on sub pixel area 300b may be turned on or turned off. In the sub fingerprint image a which is generated when the sub pixel area 300b is turned on and the right sub pixel areas 300c, 300d, 300e, and 300f are turned off, the ridges and the valleys located in the sub fingerprint acquisition area 330c are displayed and the right sub fingerprint acquisition areas 300d and 330e are displayed dark.

Then, when the pixels belonging to the sub pixel area 300c are simultaneously turned or sequentially turned on from left to right, the detection-target ray of light is totally reflected from the sub fingerprint acquisition area 330c corresponding to the sub pixel area 300c. The totally reflected detection-target ray of light arrives at the sub pixel area 300d and are incident on the image sensor layer 100. Here, the sub pixel area 300d is a sub light incidence area corresponding to the sub fingerprint acquisition area 330d. At this time, other sub pixel areas 300d, 300e, and 300f located on the right side of the turned-on sub pixel area 300c can be turned off and, for example, at least the sub pixel area 300d adjacent to the turned-on sub pixel area 300c has to be turned off. On the other hand, the sub pixel areas 300a and 300b located on the left side of the turned-on sub pixel area 300c may be turned on or turned off. In the sub fingerprint image b which is generated when the sub pixel area 300c is turned on and the right sub pixel areas 300d, 300e, and 300f are turned off, the sub fingerprint acquisition area 330c are displayed bright, the right sub fingerprint acquisition areas 330e are displayed relatively dark, and the ridges and the valleys of the fingerprint located in the sub fingerprint acquisition area 330c are displayed.

In the same way, the sub fingerprint image c is generated when the pixels belonging to the sub pixel area 300d. In the sub fingerprint image c, the sub fingerprint acquisition areas 330b and 330c are displayed relatively bright and the valleys and the ridges of the fingerprint located in the sub fingerprint acquisition area 330d are displayed.

The three band-like sub fingerprint images a, b, and c which are generated in the above-mentioned order can be used to generate one complete fingerprint image in the image sensor or the electronic device.

For example, when the display panel 300 applies rays of light to the image sensor layer 100, rays of light incident on the image sensor layer 100 are not present by a light blocking structure below the image sensor layer 100, and the pixels belonging to the sub pixel areas 300b, 300c, and 300d are simultaneously turned or sequentially turned on from left to right, the detection-target ray of light is totally reflected in the sub fingerprint acquisition area 330c, 330d, and 330e corresponding to the sub pixel areas 300b, 300c, and 300d. The totally reflected detection-target ray of light arrives at the sub pixel areas 300c, 300d, and 300e and are incident on the image sensor layer 100. At this time, the generated fingerprint image can display the ridges and the valleys of the fingerprint located in the three sub pixel areas 300b, 300c, and 300d.

The thickness $T_{sensor}$ of the image sensor layer 100 can vary depending on the light selection structure 400. The light selection structure 400 which is described below with reference to FIGS. 6 to 10 can vary depending on at what angle the detection-target ray of light is incident on the light receiving portion of the image sensor 500. On the other hand, a distance P between the light receiving portions of the image sensor 500 can be determined in consideration of a resolution and/or incidence angle selectivity of the image sensor 500. The light receiving portions can be formed to have a width smaller than that of the light receiving portions of the image sensor. In this case, the distance p between the light receiving portions can increase.

On the other hand, rays of light having a wavelength of about 600 nm or more can diffuse into the glass cover 200 due to the ridges. In this case, a part of the light intensity of the detection-target ray of light is absorbed by the ridges, but rays of light having a detection-target incidence angle out of the diffused rays of light can arrive at the image sensor 500. Accordingly, the contrast between the ridges and the valleys decreases and the quality of the fingerprint image generated by the image sensor 500 can be lowered. In order to prevent this problem, for example, a band-pass filter layer (not illustrated) that transmits only rays of light with a short wavelength of 600 nm or less can be formed on the top surface of the glass cover, the top surface of the display panel 300, or the top surface of the image sensor layer 100. For example, a fingerprint image may be formed by turning on pixels generating rays of light with a specific wavelength or less, for example, only green (G) and/or blue (B) pixels, out of a plurality of pixels of the display panel 200.

Figure 5:
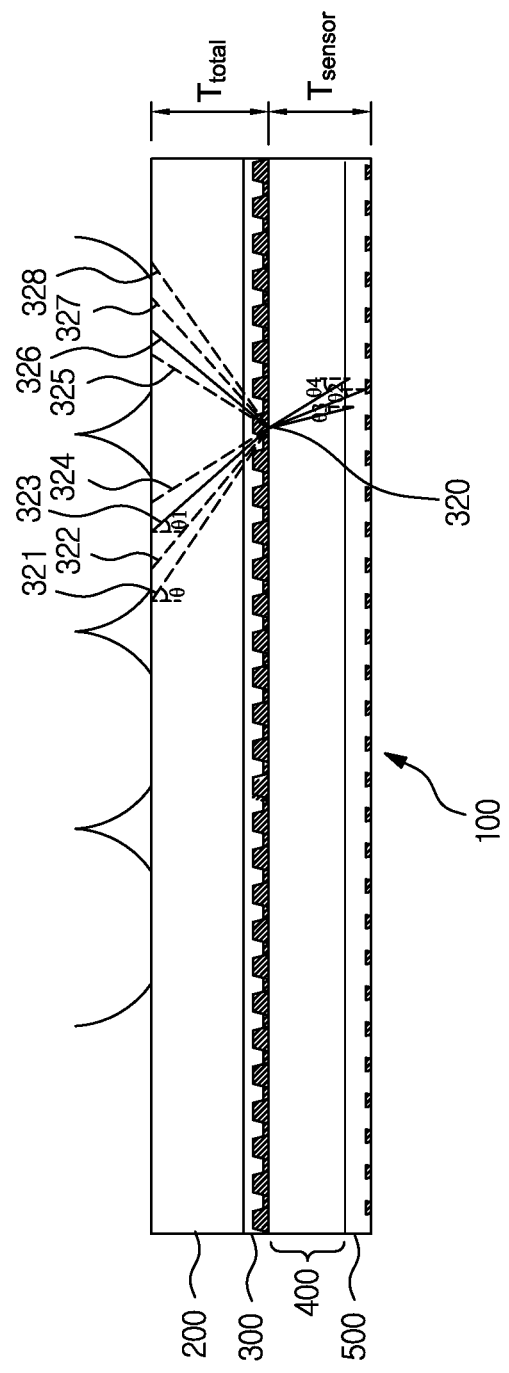
FIG. 5 is a sectional view illustrating another display having a fingerprint recognition function taken along line I-I' in FIG. 1.

FIG. 5 is a sectional view illustrating another display having a fingerprint recognition function taken along line I-I' in FIG. 1.

Referring to FIG. 5, the electronic device has a structure in which a protective medium, a touch sensor, a polarization film, a display panel 300, and an image sensor layer 100 are stacked. Since rays of light from the valleys of the fingerprint should be incident on the glass cover 200, the glass cover 200 is formed to transmit near-infrared rays of light. Here, the polarization film has characteristics of blocking visible rays of light incident from the outside and transmitting near-infrared rays of light substantially without a loss. Description of the same elements as illustrated in FIG. 3 will not be repeated.

A light source emitting near-infrared rays of light can be located inside the display panel 300 or outside the display panel 300. Here, the light source is located inside the electronic device 10 and can apply near-infrared rays of light to a finger.

Rays of light 321 to 328 which are incident on the glass cover 200 from the ridges located on the top surface of the glass cover 200 arrive at a first point 320 on the display panel 300. The incidence angles $\theta_{i1}$ of the rays of light 321 to 328 are angles with respect to a straight line perpendicular to the top surface of the glass cover 200. The rays of light 321 to 328 are incident on different points on the top surface of the glass cover 200 and arrive at the first point 320 on the display panel 300 through different optical paths. Out of the rays of light 321 to 328 incident on the image sensor layer 100 image sensor layer 100 via the first point 320, rays of light 325 to 328 incident on the first point 320 from the right side of the first point 320 are blocked by the light selection structure 400. In addition, out of rays of light 321 to 324 incident on the first point 320 from the left side of the first point 320, rays of light 321, 322, and 324 having incidence angles $\theta_{i1}$ other than the detection-target incidence angle $\theta_1$ are blocked by the light selection structure 400 or propagate through an optical path different from that of the detection-target ray of light. That is, the detection-target ray of light is refracted to arrive at the light receiving portions of the image sensor 500 by the light selection structure 400 and are incident on the light receiving portions at an incidence angles $\theta_2$, and rays of light 321, 322, and 324 having incidence angles $\theta_{i1}$ other than the detection-target incidence angle $\theta_1$ are finally refracted at an incidence angle $\theta_3$ or $\theta_4$ and are not incident on the light receiving portions or are blocked by the light selection structure 400.

A point on the glass cover 200 on which the detection-target ray of light 323 is incident and the light receiving portion detecting the detection-target ray of light are not located on the same vertical line. The light selection structure 400 blocks rays of light having common incidence angles out of the rays of light from the ridges and the valleys of the fingerprint and allows only some of the rays of light from the ridges to arrive at the image sensor 500. Accordingly, the detection-target ray of light passes through the glass cover 200 and the display panel 300 via an inclined optical path. Accordingly, the point on the glass cover 200 on which the detection-target ray of light 323 is incident and the point on the image sensor layer 100 on which the detection-target ray of light is incident are located on the same vertical line. The horizontal distance between the point on the glass cover 200 on which the detection-target ray of light 323 is incident and the point on the image sensor layer 100 on which the detection-target ray of light is incident can be determined by the total thickness $T_{total}$ which is the sum of the thickness of the glass cover 200 and the thickness of the display panel 300 and the detection-target incidence angle $\theta_1$ of the ray of light 323. That is, when the total thickness $T_{total}$ increases or the detection-target incidence angle $\theta_1$ increases, the horizontal distance can increase.

When a near-infrared light source is located inside the electronic device, the display panel 300 can turn off the pixels located in the fingerprint acquisition area 30 to generate a fingerprint image. When the near-infrared light source is located inside the display panel 300, the display panel 300 turns off R, G, and B pixels located in the fingerprint acquisition area 30 and turn on near-infrared pixels therein to generate a fingerprint image. The turning-off of a pixel can be controlled directly or indirectly, for example, by an application processor (AP) of the electronic device or a timing controller (TCON) of the display panel.

On the other hand, the image sensor layer 100 may include a high-pass filter or a band-pass filter (not illustrated). The high-pass filter transmits rays of light with a wavelength of 720 nm or more and the band-pass filter transmits rays of light with a wavelength of 720 nm to 980 nm. The high-pass filter or the band-pass filter can be located on a horizontal plane on an optical path such as the top surface of the image sensor layer 100 or the top surface of the image sensor 500. The high-pass filter or the band-pass filter can be formed by coating the horizontal plane with a material having filtering characteristics. Almost visible rays of light incident from the outside are blocked by the polarization film of the glass cover 200, and rays of light emitted from the pixels of the display panel 300 may be incident on the image sensor layer 100 directly or indirectly after being reflected by the glass cover 200. Accordingly, the high-pass filter or the band-pass filter prevent visible rays of light from being incident on the light receiving portions of the image sensor 500 in order to prevent a decrease in quality of a fingerprint image due to the visible rays of light.

Figure 6A:
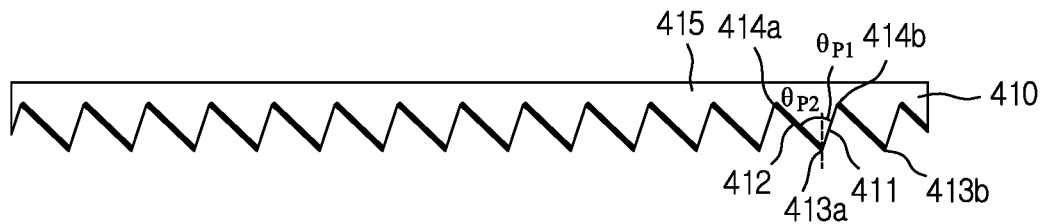
FIGS. 6A and 6B are sectional views illustrating an image sensor layer according to an embodiment.
Figure 6B:
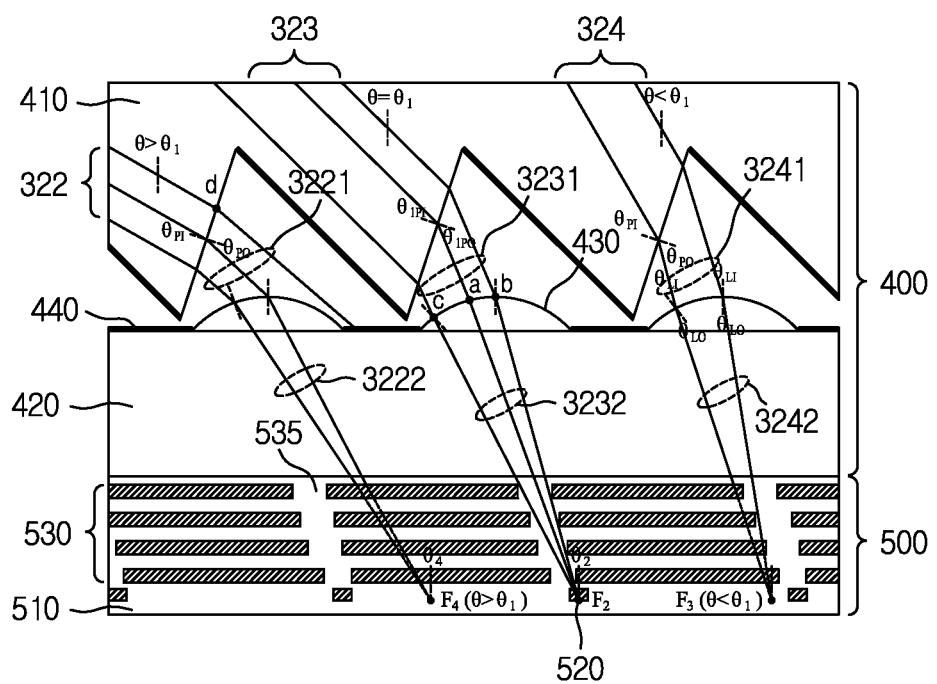

FIGS. 6A and 6B are sectional views illustrating an image sensor layer according to an embodiment.

Referring to FIGS. 6A and 6B, the image sensor layer 100 includes a light selection structure 400 and an image sensor 500. The light selection structure 400 is located below the display panel 300. The light selection structure 400 includes a prism sheet 410 and microlenses 430. The prism sheet 410 and the microlenses 430 select a detection-target ray of light out of rays of light which are incident on the image sensor layer 100 at various incidence angles through the glass cover 200 and the display panel 300.

In FIG. 6A, the prism sheet 410 includes first inclined surfaces 411 that refract rays of light incident thereon and second inclined surfaces 412 that absorb rays of light incident thereon. The first inclined surfaces 411 and the second inclined surfaces 412 which are alternately arranged alternately form a prism ridge and a prism valley. The prism ridge faces the microlenses 430 and the prism valley faces the display.

The first inclined surfaces 411 of the prism sheet 410 refract rays of light 322, 323, and 324 which are incident from the upper-left side to the lower-right side, and the second inclined surfaces 412 block rays of light which are incident from the upper-right side to the lower-left side. For this purpose, a first inclined surface 411 is formed obliquely between a prism ridge 413a and a prism valley 414b, and a second inclined surface 412 is formed obliquely between a prism ridge 413a and a prism valley 414a. In FIG. 6A, an inclination angle of the first inclined surface 411 with respect to a straight line perpendicular to the top surface 415 of the prism sheet 400 is $\theta_{P1}$, and an inclination angle of the second inclined surface 412 with respect to the straight line perpendicular to the top surface 415 of the prism sheet 400 is $\theta_{P2}$. In the drawings, $\theta_{P1}$ and $\theta_{P2}$ are different from each other, but $\theta_{P1}$ and $\theta_{P2}$ may be substantially the same as each other as well. In the drawings, it is assumed that $\theta_{P1}$ ranges from about 15 degrees to about 20 degrees and $\theta_{P2}$ ranges from about 30 degrees to about 50 degrees. As $\theta_{P2}$ increases, the light intensity of the detection-target ray of light incident on the light receiving portion 520 can increase. An interior angle of the prism ridges and the prism valleys which are formed by the first inclined surfaces 411 and the second inclined surfaces 412 is $\theta_{P1}+\theta_{P2}$ and the detection-target incidence angle at which rays of light are incident on the light receiving portion 520 can be determined depending on the interior angle $\theta_{P1}+\theta_{P2}$ or a prism pitch (that is, an interval between the prism ridge 413a and the prism ridge 413b or an interval between the prism valley 414a and the prism valley 414b).

On the other hand, a light absorbing layer including a light absorbing material can be formed on the surface of the second inclined surfaces 412. The light absorbing layer formed on the surface of the second inclined surfaces 412 absorbs rays of light which are incident thereon from the upper-right side to the lower-left side. As a result, rays of light having an incidence angel other than the detection-target incidence angle do not arrive at the light receiving portions 520.

In FIG. 6B, the microlenses 430 refract the detection-target ray of light out of the rays of light passing through the prism sheet 410 and allows the detection-target ray of light to propagate to the light receiving portions 520. In order to enhance incidence angle selectivity by the microlenses 430, an optical path extending layer 420 may be interposed between the microlenses 430 and the image sensor 500. The thickness of the optical path extending layer 420 may be, for example, about five times the central thickness of the microlenses 430, which is merely an example and can increase or decrease depending on various factors such as a spherical aberration of the microlenses 430 and the detection-target incidence angle. The refractive indexes of the microlenses 430 and the optical path extending layer 420 can be substantially the same. In one embodiment, a light absorbing layer 440 including a light absorbing material can be formed in some areas in which the microlenses 430 are not formed on the top surface of the optical path extending layer 420. The light absorbing layer 440 prevents rays of light having an incidence angle other than the detection-target incidence angle from passing through the optical path extending layer 420 and being incident on the image sensor 500.

Instead of the conventional purpose of increasing the light intensity of rays of light incident on the light receiving portions 520, the microlenses 430 are used for the purpose of causing only rays of light having a specific angle to be incident on the light receiving portions 520 in the image sensor layer 100. For this purpose, the microlenses 430 are formed on the light receiving portions 520 of the image sensor 500 including a metal layer 530 to correspond to optical paths 525 which are defined by a plurality of metal lines. That is, the microlenses 430 are located below the prism sheet 410 and are separated from the prism sheet 410. Accordingly, air is interposed between the prism sheet 410 and the microlenses 430. The detection-target ray of light applied from the top surface of the glass cover 200 can be selected using a difference in refractive index between the prism sheet and the air and a difference in refractive index between the air and the microlenses.

The image sensor 500 includes the light receiving portions 520 formed on a substrate 510 and the metal layer 530 that is formed on the light receiving portions 520 and defines the optical paths 535.

The light receiving portions 520 are located below the corresponding microlenses 430 and serve to detect incident rays of light and to generate a pixel current. The metal layer 530 that forms an optical path and serves as electrical wiring is interposed between the microlenses 430 and the light receiving portions 520.

In order to improve incidence angle selectivity, the center of each light receiving portion 520 and the center of the corresponding microlens 430 may not coincide with each other. In FIGS. 6A and 6B, the light receiving portion 520 is located at a lower-right corner of the corresponding microlens 430. Here, the position of the light receiving portion 520 is a position which can be reached by the detection-target ray of light refracted by the corresponding microlens 430, and can be detected by various factors such as the detection-target incidence angle, the refractive index of the microlenses 430, and the distance between the microlens 430 and the corresponding light receiving portion 520. By this arrangement, the incidence angle selectivity of the image sensor layer 100 can be improved.

On the other hand, in order to improve the incidence angle selectivity, the width of each light receiving portion 520 is set to be smaller than the diameter of each microlens 430. When the width of the light receiving portion 520 is larger, rays of light having an angle other than the detection-target incidence angle can also be detected. Accordingly, when the light receiving portion 520 is formed at a point which can be reached by the detection-target ray of light refracted by the light selection structure 400 and the microlens 430, rays of light having an angle other than the detection-target incidence angle reaches the top surface of the substrate 510 on which no light receiving portion 520 is formed. For example, the width of the light receiving portion 520 may be set to be equal to or less than about 50% of the diameter of the microlens 430.

The metal layer 530 can be formed below the microlenses 430. A plurality of metal lines constituting the metal layer 530 form electrical wiring for transmitting a control signal to the light receiving portions 520 or drawing a pixel current generated by the light receiving portions 520 to the outside. The plurality of metal lines can be electrically isolated from each other by an inter-metal dielectric (IMD) or the like. The optical paths defined by the plurality of metal lines can be formed by the IMD. For example, since a ray of light selected by the microlenses 430 is incident obliquely on the surface of the light receiving portion 520, the optical paths can also be formed obliquely. On the other hand, each optical path can be formed to have a sectional area which is smaller than that of an optical path of a general CMOS image sensor (CIS). For example, the optical paths defined by the plurality of metal lines may be formed to be perpendicular to the top surface of the light receiving portions 520. Such an optical path having a relatively small sectional area is disclosed in Korean Patent Application Laid-Open No. 10-2016-0048646, which is incorporated herein by reference.

On the other hand, although not illustrated, the metal layer 530 may be formed on the substrate 510 below the light receiving portions 520. That is, the display having a fingerprint recognition function can be implemented using a CIS with a front surface illumination (FSI) structure as well as a CIS with a back surface illumination (BSI) structure.

The principle of selecting a detection-target ray of light depending on an incidence angle on the image sensor layer 100 will be described below.

FIG. 6B illustrates rays of light 322, 323, and 324 which arrive at different points in the horizontal direction depending on an incidence angle $\theta$ on the image sensor layer 100. In the following description, an incidence angle refers to an angle between a propagating direction of a ray of light when the ray of light is incident on the image sensor layer 100 from the top surface of the glass cover 200 and a straight line perpendicular to the top surface 415 of the prism sheet 410. First, the ray of light 322 having an incidence angle θ larger than the detection-target incidence angle $θ_1$ is refracted by the first inclined surface 411 of the prism sheet 410 and the microlens 430 and may propagate to point $f_4$ left from the light receiving portion 520. The ray of light 324 having an incidence angle θ smaller than the detection-target incidence angle $θ_1$ is refracted by the first inclined surface 411 of the prism sheet 410 and the microlens 430 and may propagate to point $f_3$ right from the light receiving portion 520. However, the rays of light 322 and 324 are blocked by the metal layer 530 and thus do not arrive at the left point $f_4$ or the right point $f_3$ of the light receiving portion 520. On the other hand, the ray of light 323 having an incidence angle θ which is substantially the same as the detection-target incidence angle $θ_1$ is refracted by the first inclined surface 411 of the prism sheet 410 and the microlens 430 and then arrives at the light receiving portion 520 through an optical path 535 which is defined by the metal layer 530. Here, the detection-target incidence angle $θ_1$ is substantially the same as the glass cover incidence angles when the ray of light is applied from the glass cover 200.

The ray of light 323 having the detection-target incidence angle $θ_1$ is refracted to the microlens 430 by the first inclined surface 411. An angle between the straight line perpendicular to the first inclined surface 411 and the ray of light 323 is $θ_{1PI}$ and an angle between the straight line and the refracted ray of light 3231 is $θ_{1PO}$. That is, the incidence angle of the ray of light 323 on the first inclined surface 411 is $θ_{1PI}$ and a refraction angle is $θ_{1PI}$. Here, since the refractive index of the prism sheet 410 is greater than the refractive index of the air, $θ_{1PO}$ is greater than $θ_{1PO}$ based on the Snell's law.

The ray of light 3231 refracted by the first inclined surface 411 is refracted to the light receiving portion 520 by the microlens 430. The spherical aberration of the microlens 430 is determined such that the ray of light 323 having the detection-target incidence angle $θ_1$ propagates to the light receiving portion 520 at the time of being refracted and input by the first inclined surface 411. At this time, the incidence angle of the refracted ray of light 3231 on the microlens 430 may be equal to or less than 20 degrees. Since the normal line at point a of the microlens 430 is substantially the same as the incidence angle of the refracted ray of light 3231, the ray of light 3231 propagates to the light receiving portion 520 without being refracted. An angle between the normal line and the ray of light 3231 increases to the left side of the normal line, that is, in the counterclockwise direction from point a to point b, and an angle between the normal line and the ray of light 3231 increases to the right side of the normal line, that is, in the clockwise direction. Accordingly, the ray of light 3231 is refracted in the clockwise direction at point b and propagates to the light receiving portion 520. The ray of light 3231 is refracted in the counterclockwise direction at point c and propagates to the light receiving portion 520. Here, since the ray of light 3231 is incident on the microlens 430 through the air and the refractive index of the air is less than the refractive index of the microlens, the refraction angle by the microlens 430 is smaller than the incidence angle on the microlens 430. The ray of light 3232 refracted by the microlens 430 arrives at the light receiving portion 520 at an incidence angle $θ_2$.

A portion of the ray of light 322 having an incidence angle θ which is larger than the detection-target incidence angle $θ_1$ is refracted to the microlens 430 by the first inclined surface 411. An angle between a straight line perpendicular to the first inclined surface 411 and the ray of light 322 is $θ_{PI}$, and an angle between the straight line and the refracted ray of light 3221 is $θ_{PO}$. Since the incidence angle θ is larger than the detection-target incidence angle $θ_1$, the refraction angle $θ_{PO}$ by the first inclined surface 411 is smaller than $θ_{1PO}$. Accordingly, even when the refracted ray of light 3221 is incident on the same point on the microlens 430, the incidence angle of the refracted ray of light 3221 on the microlens 430 is larger than that of the refracted ray of light 3231. Accordingly, the ray of light 3222 refracted by the microlens 430 propagates to the left side of the light receiving portion 520 at an incidence angle $θ_4$. The refracted ray of light 3222 propagating to the left point $f_4$ does not pass through the optical path 535 defined by the metal layer 530. On the other hand, the ray of light 3221 refracted at the point d on the first inclined surface 411 is absorbed by the light absorbing layer formed between two microlenses 430 and thus is not incident on the image sensor 500.

The ray of light 324 having an incidence angle θ which is smaller than the detection-target incidence angle $θ_1$ is refracted to the microlens 430 by the first inclined surface 411. An angle between the straight line perpendicular to the first inclined surface 411 and the ray of light 324 is $θ_{PI}$, and an angle between the straight line and the refracted ray of light 3221 is $θ_{PO}$. Since the incidence angle θ is smaller than the detection-target incidence angle $θ_1$, the refraction angle $θ_{PO}$ by the first inclined surface 411 is larger than $θ_{1PO}$. Accordingly, even when the refracted ray of light 3221 is incident on the same point on the microlens 430, the incidence angle of the refracted ray of light 3241 on the microlens 430 is smaller than that of the refracted ray of light 3231. Accordingly, the ray of light 3242 refracted by the microlens 430 propagates to the right side of the light receiving portion 520 at an incidence angle $θ_3$. The refracted ray of light 3242 propagating to the right point $f_3$ does not pass through the optical path 535 defined by the metal layer 530.

Figure 7A:
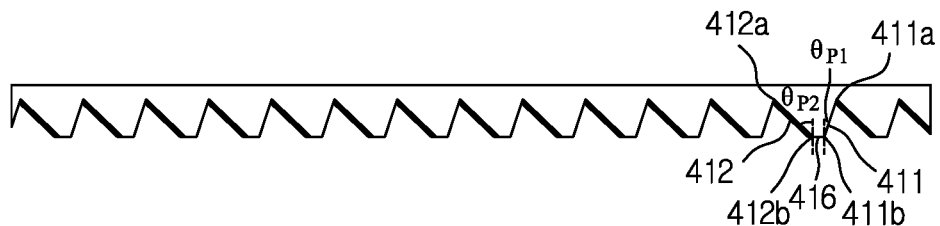
FIGS. 7A and 7B are sectional views illustrating a section of an image sensor layer according to another embodiment.
Figure 7B:
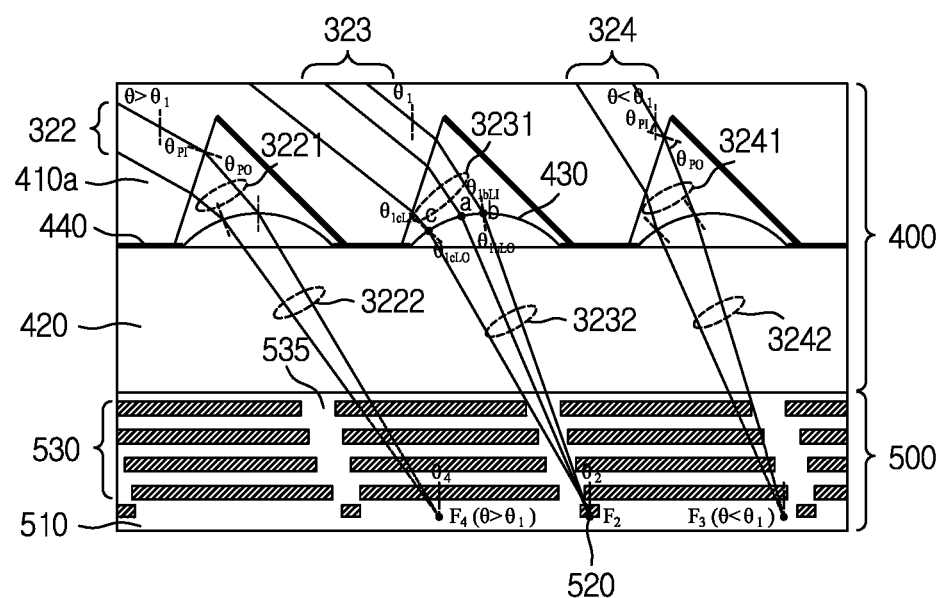

FIGS. 7A and 7B are sectional views illustrating a section of an image sensor layer according to another embodiment. The elements which are substantially identical or similar to those illustrated in FIG. 6 will not be described and differences from those illustrated in FIG. 6 will be mainly described below.

Referring to FIGS. 7A and 7B, the image sensor layer 100 includes a light selection structure 400 and an image sensor 500. The light selection structure 400 is disposed below a display panel 300. The light selection structure 400 includes a prism sheet 410a and microlenses 430. The prism sheet 410a and the microlenses 430 select a detection-target ray of light out of rays of light incident thereon at various incidence angles.

In FIG. 7A, the prism sheet 410a has a self-aligning and self-supporting structure. Compared with the prism sheet 410 illustrated in FIGS. 6A and 6B, the prism sheet 410a has a structure in which a tip of a prism ridge is removed. Specifically, a top end 411a of a first inclined surface 411 is coupled to a top end 412a of a second inclined surface 412 to form a prism valley, both ends of a bottom surface 416 extending laterally in substantially parallel to a top surface 415 of the prism sheet 410a connect a bottom end 411b of the first inclined surface 411 and a bottom end 412b of the second inclined surface 412. The width of the bottom surface 416 may be substantially equal to or less than a distance between the microlenses 430. Accordingly, the prism sheet 410a and the microlenses 430 can be aligned by only arranging the bottom surface 416 of the prism sheet 410a between the microlenses 430. Since the prism sheet 410a can be supported by the bottom surface 416 which is substantially horizontal, a particular structure for supporting or fixing the prism sheet 410a is not necessary.

Figure 8A:
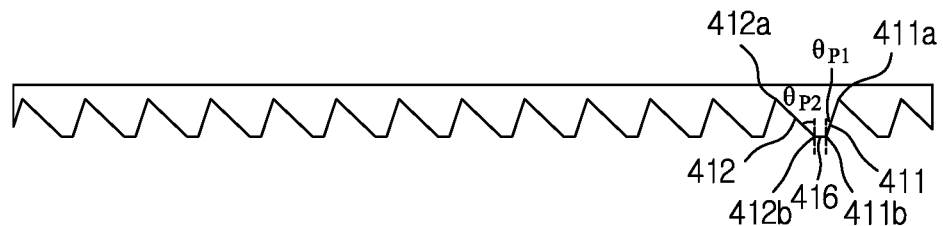
FIGS. 8A and 8B are sectional views illustrating a cross-section of an image sensor layer according to another embodiment.
Figure 8B:
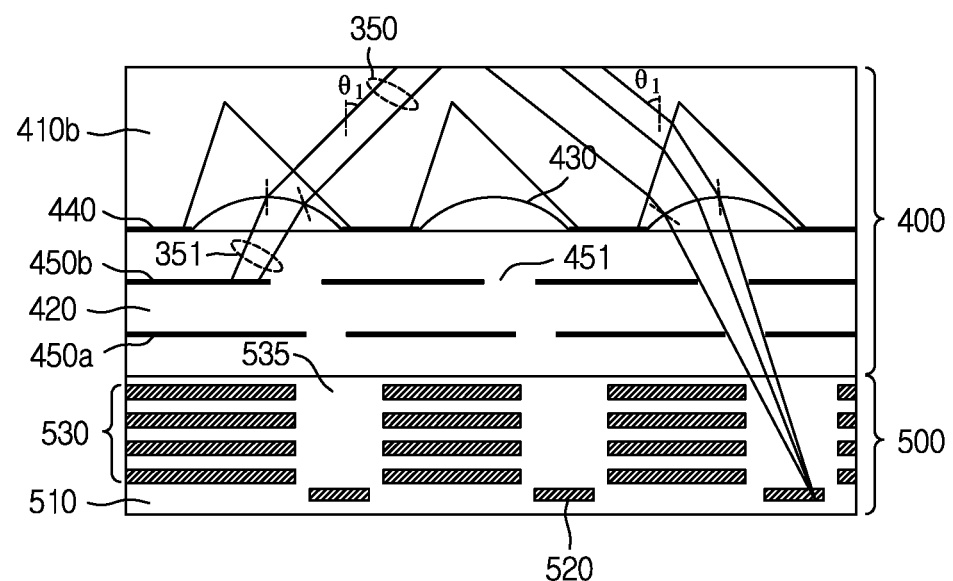

FIGS. 8A and 8B are sectional views illustrating a cross-section of an image sensor layer according to another embodiment. Description of the elements substantially identical or similar to those illustrated in FIGS. 6A and 6B and FIGS. 7A and 7B will not be repeated and differences from 6A and 6B and FIGS. 7A and 7B will be mainly described.

Referring to FIGS. 8A and 8B, the image sensor layer 100 includes a light selection structure 400 and an image sensor 500. The light selection structure 400 is disposed below a display panel 300. The light selection structure 400 includes a prism sheet 410b and microlenses 430. The prism sheet 410b and the microlenses 430 select a detection-target ray of light out of rays of light incident thereon at various incidence angles.

In FIG. 8A, the prism sheet 410b has a self-aligning and self-supporting structure. Compared with the prism sheet 410a illustrated in FIGS. 7A and 7B, a light absorbing layer is not formed in a second inclined surface 412 of the prism sheet 410b. As described above, the light absorbing layer formed on the second inclined surface 412 in FIGS. 7A and 7B absorbs a ray of light 350 which is incident from the upper right side to the lower-left side such that the ray of light in this direction is not incident on the image sensor 500. Specifically, a part of the ray of light 350 incident on the image sensor layer 100 from the upper-right side to the lower-left side is refracted by the second inclined surface 417 of the prism sheet 410b and is incident on the microlens 430. However, a refracted ray of light 351 is absorbed by a light absorbing layer 450b and is not incident on the image sensor 500.

In order to block the ray of light 350 which is incident from the upper right side to the lower-left side, one or more light absorbing layer 450a and 450b are formed in an optical path extending layer 420. For example, the light absorbing layers 450a and 450b may be formed of a light absorbing material and extend in the horizontal direction. For example, the light absorbing layers 450a and 450b may be formed of a metal and extend in the horizontal direction. Additionally, the top surface of the metal may be coated with a light absorbing material that absorbs visible light or infrared light. The light absorbing material with which the metal is coated can absorb light reflected from the metal. The light absorbing layers 450a and 450b are formed on the surface of an optical path extending layer 420 which has been formed, for example, by a predetermined proportion of a target thickness. Thereafter, the optical path extending layer 420 is formed up to the target thickness on the light absorbing layers 450a and 450b. A plurality of light absorbing layers 450a and 450b illustrated in FIG. 8B can be obtained by repeatedly forming an optical path extending layer and a light absorbing layer.

The light absorbing layers 450a and 450b formed in the optical path extending layer 420 can define an optical path for a detection-target ray of light. Openings 451 for defining an optical path are formed in a part of the light absorbing layers 450a and 450b. The width or diameter of each opening 451 is determined such that a detection-target ray of light refracted by the microlenses 430 can pass through the opening. Accordingly, in a structure in which an optical path is defined by the light absorbing layers 450a and 450b, an optical path 535 may not be defined in the image sensor 500 by the metal layer 530. In other words, satisfactory incidence angle selectivity can be secured by the optical path extending layer 420 even when using an image sensor in which an optical path 535 is vertically formed.

Figure 9:
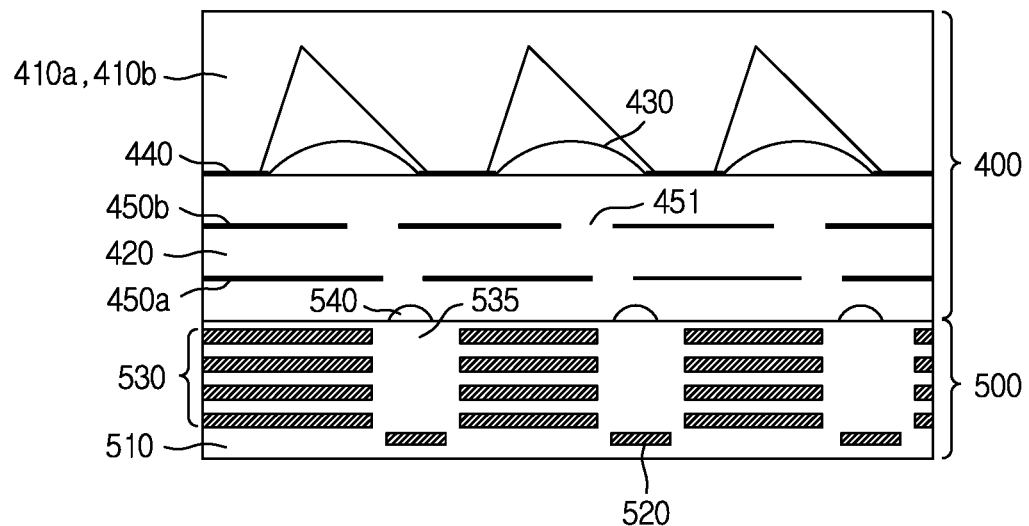
FIG. 9 is a sectional view illustrating a cross-section of an image sensor layer according to another embodiment.

FIG. 9 is a sectional view illustrating a cross-section of an image sensor layer according to another embodiment. Description of the elements substantially identical or similar to those illustrated in FIGS. 6A to 8B will not be repeated and differences from 6A to 8B will be mainly described.

Referring to FIG. 9, the image sensor layer 100 includes a light selection structure 400 and an image sensor 500. The light selection structure 400 is disposed below a display panel of an electronic device. The light selection structure 400 includes a prism sheet 410a or 410b and microlenses 430. The prism sheet 410a or 410b and the microlenses 430 select a detection-target ray of light out of rays of light incident thereon at various incidence angles.

In order to enhance incidence angle selectivity, microlenses 540 are formed on the top surface of the image sensor 500. The microlenses 540 can be formed on an optical path 535 of the image sensor 500. Similarly to the microlenses 430 of the light selection structure 400, the microlenses 540 refract a detection-target ray of light incident on the image sensor 500 to propagate to the light receiving portion 520. The light selection structure 400 is formed on the image sensor 500 including the microlenses 540 and the surfaces of the microlenses 540 are in contact with the optical path extending layer 420. Accordingly, in order to refract the detection-target ray of light incident on the microlenses 540, the refractive index of the optical path extending layer 420 and the refractive index of the microlenses 540 should be different from each other. For example, the difference between the refractive index of the optical path extending layer 420 and the refractive index of the microlenses 540 may be equal to or greater than 0.2.

Figure 10:
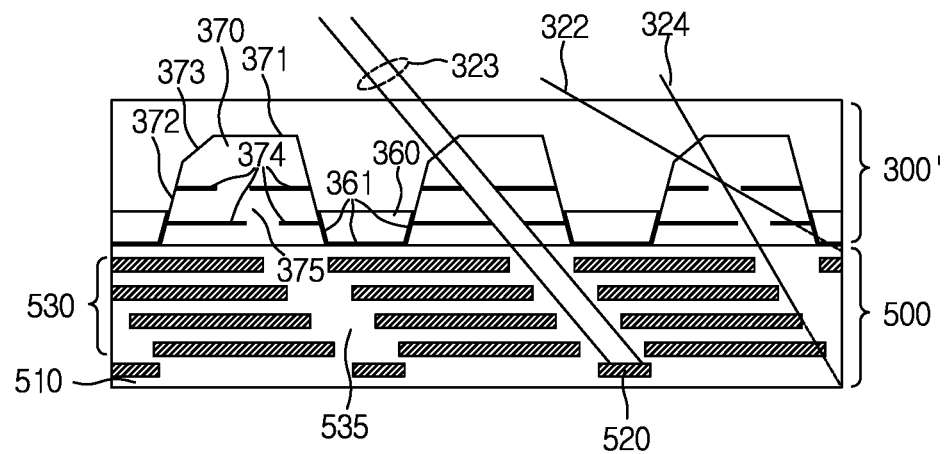
FIG. 10 is a sectional view illustrating a cross-section of a display having a fingerprint recognition function according to another embodiment.

FIG. 10 is a sectional view illustrating a cross-section of a display having a fingerprint recognition function according to another embodiment. Description of the elements substantially identical or similar to those illustrated in FIGS. 6A to 9 will not be repeated and differences from 6A to 9 will be mainly described.

Referring to FIG. 10, the display having a fingerprint recognition function includes a display panel 300' and an image sensor 500. The image sensor 500 is disposed below the display panel 300'. The light selection structure 400 illustrated in FIGS. 6 to 9 is implemented in the display panel 300'. The display panel 300' transmits a detection-target ray of light 323 out of rays of light incident thereon from a glass cover 200 and prevents rays of light 322 and 325 having other incidence angles from arriving at the light receiving portion 520.

The display panel 300' includes a pixel defining film 370 that defines pixels 360 and areas in which the pixels are located. Openings are formed in some areas of the pixel defining film 370, and the pixels 360 are formed in the openings. In case of OLED, light emitting portions are formed in the openings. The pixel defining film 370 can be formed of various insulating materials. Here, the insulating materials can transmit visible light and/or near-infrared light. On the other hand, TFTs for driving the pixels 360 and electrical wirings can be disposed in the pixel defining film 370 or below the pixels 360. A light blocking layer 361 is formed below the pixels 360. On the other hand, the light blocking layer 361 prevents rays of light generated by the pixels 360 and rays of light passing through the pixels 360 from propagating to a lower side thereof.

In one embodiment, an optical path 375 extending substantially in the same direction as the propagating direction of a detection-target ray of light can be formed in the pixel defining film 370. The optical path can be formed to be inclined with respect to the top surface of the image sensor 500 by a detection-target incidence angle. The optical path 375 can be formed of one or more optically opaque materials. FIG. 10 illustrates two optical path defining layers 374 which are stacked in the vertical direction. The optical path defining layers 374 include openings which are formed in some area to define the optical path 375. The centers of the openings formed in the optical path defining layers 374 do not match each other in the vertical direction. The optical path defining layers 374 may be electrodes and/or wirings for driving the pixels. On the other hand, the optical path defining layers 374 may be formed of a light absorbing material.

In another embodiment, the top surface 371 and the side surface 372 of the pixel defining film 370 can be connected by an incidence surface 373. The incidence surface 373 can be formed to be substantially perpendicular to the propagating direction of a detection-target ray of light 323. The incidence surface 373 can decrease an amount of a detection-target ray of light which is refracted or reflected by the surface of the pixel defining film 370. Additionally, when a difference in refractive index occurs at the surface of the pixel defining film 370, a ray of light propagating at an incidence angle other than a detection-target incidence angle can be refracted such that the ray of light does not arrive at the light receiving portion 520.

On the other hand, FIG. 10 illustrates an optical path 535 which is defined by the metal layer 530 of the image sensor 500. When incidence angle selectivity of the display panel 300' is satisfactorily excellent, an image sensor in which an optical path is formed vertically as illustrated in FIGS. 8A to 9 can be used.

Figure 11A:
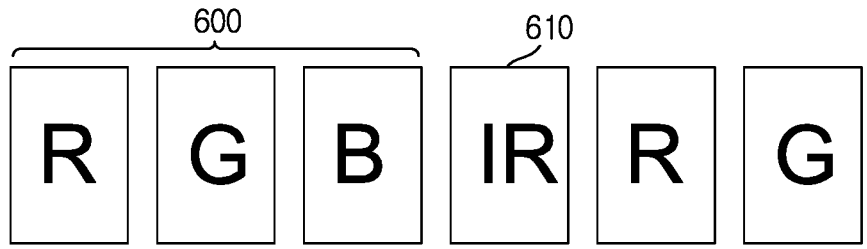
FIGS. 11A to 11C are diagrams illustrating a pixel array of a display panel.
Figure 11B:
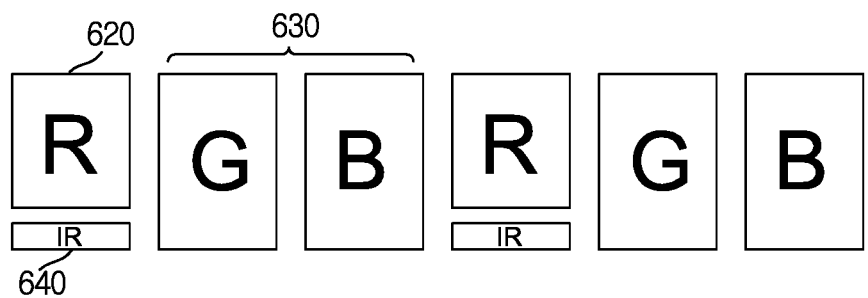
Figure 11C:
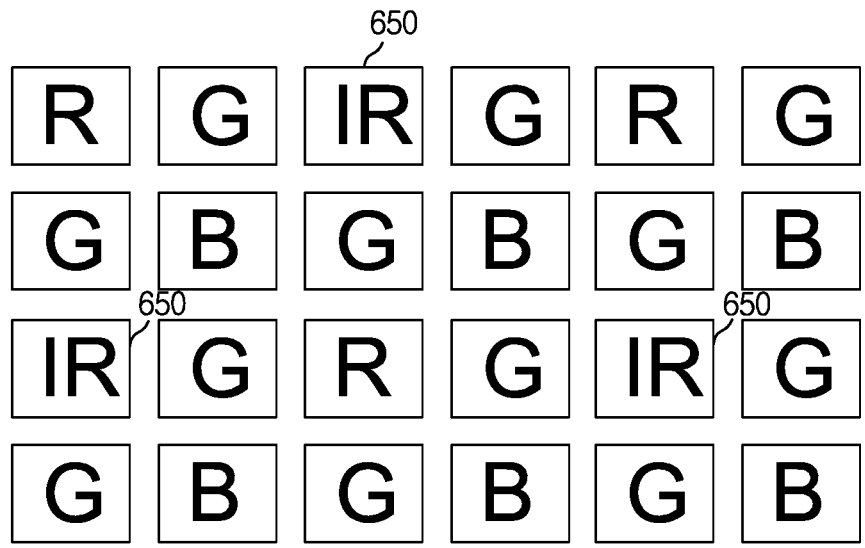

FIGS. 11A to 11C are diagrams illustrating a pixel array of a display panel.

Near-infrared rays of light which are used to generate a fingerprint image can be emitted from a light source which is located in a display panel 300. FIGS. 11A to 11C illustrate examples of a pixel array including near-infrared pixels.

Referring to FIG. 11A, a near-infrared pixel 610 can be disposed between pairs of R, G, and B 600. The near-infrared pixel 610 can occupy substantially the same area as the area of each of R, G, and B pixels.

On the other hand, referring to FIG. 11B, a near-infrared light source 640 can be disposed in one of R, G, and B pixels 620 and 630. For example, an area occupied by an R pixel 620 is decreased and then the near-infrared light source 640 can be disposed in an area which is secured by decreasing the area.

One of R, G, and B pixels can be replaced with a near-infrared pixel 650. In a Bayer pattern illustrated in FIG. 11C, some of R pixels are replaced with near-infrared pixels 650.

The display having a fingerprint recognition function which has been described above with reference to FIGS. 1 to 11C has a structure in which an image sensor layer 100 that generates a fingerprint image and a display panel 300 that outputs an image are coupled. Accordingly, a fingerprint image can be generated even when a finger is located at an arbitrary point on the glass cover 200. A fingerprint sensor package having substantially the same function and structure as the image sensor layer 100 can generate a fingerprint image of a finger which is located at a predetermined point on the glass cover 200. A fingerprint sensor package will be described below.

Figure 12:
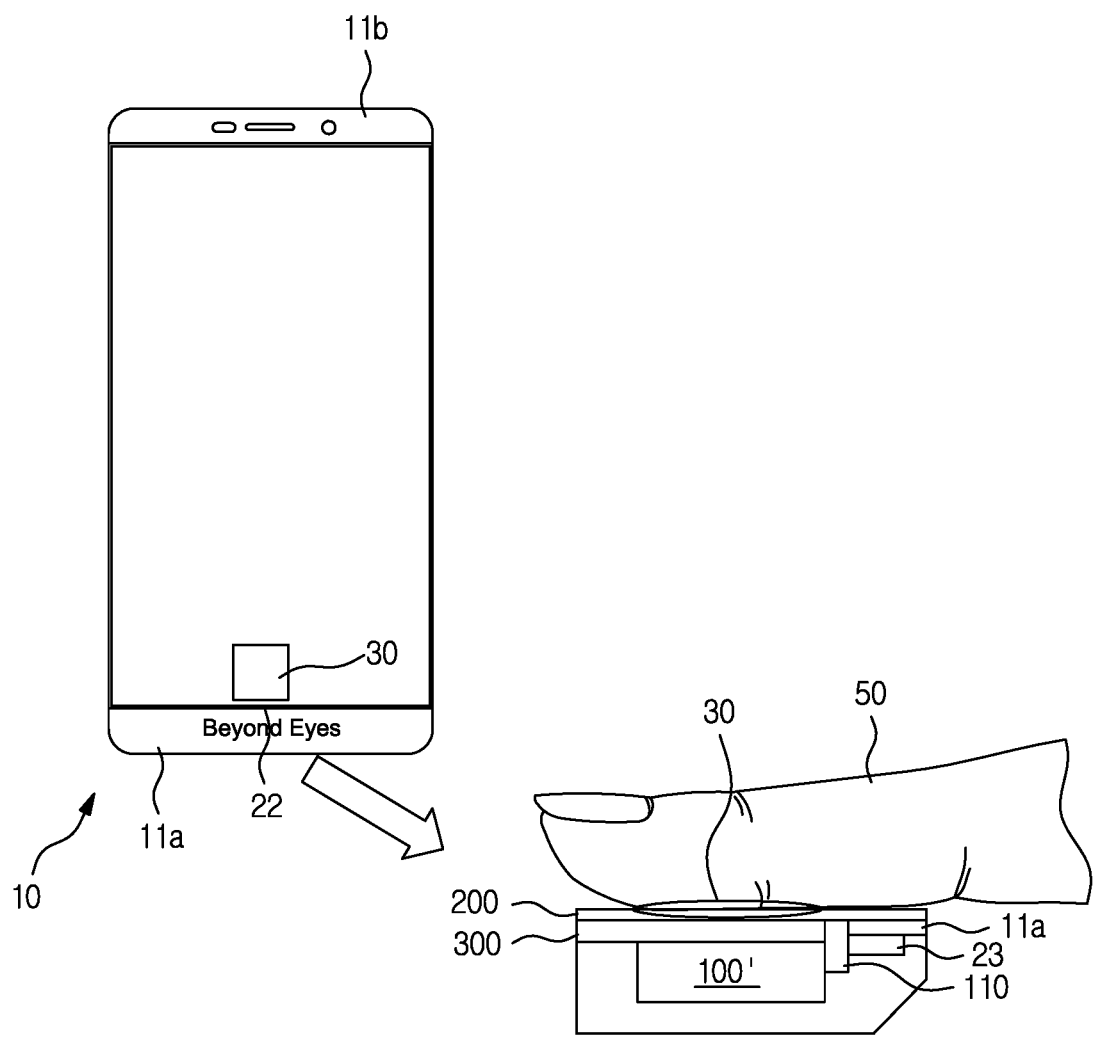
FIG. 12 is a diagram schematically illustrating an example of an electronic device to which a fingerprint sensor package is coupled.

FIG. 12 is a diagram schematically illustrating an example of an electronic device to which a fingerprint sensor package is coupled.

Referring to FIG. 12, a display panel 300 is disposed below a glass cover 200, and a fingerprint sensor package 100' is disposed below the display panel 300. Rays of light which is required for the fingerprint sensor package 100' to generate a fingerprint image are generated in an electronic device 10 and is applied to a finger. Here, the rays of light may be, for example, near-infrared rays of light with a wavelength of 720 nm to 980 nm, and a light source 110 that emits near-infrared rays of light is coupled to or separated from the fingerprint sensor package 100' and is disposed inside the electronic device 10. One or more light sources 110 can be disposed in a part of an edge area of the display panel 300. A light source driving circuit that drives the light source 100 can be incorporated in the fingerprint sensor package 100' or may be disposed inside the electronic device.

A ray of light incident on the skin of a finger 50 is reflected from a ridge of a fingerprint in contact with the glass cover 200 and is incident on the glass cover 200. On the other hand, a ray of light reflected from a valley not in contact with the glass cover 200 passes through air interposed between the skin and the glass cover 200 and is then incident on the glass cover 200. In order to reduce a light loss which is caused while passing through the skin of the finger 50, a distance between an area 22 to which rays of light are applied and a fingerprint acquisition area 30 is preferably as small as possible. The fingerprint acquisition area 30 is determined depending on the position of the fingerprint sensor package 100'. Accordingly, when one side of the fingerprint sensor package 100' having a rectangular shape is substantially in contact with or is located close to a lower coated area 11a, it is preferable that the area 22 to which rays of light are applied be also located closer to an interface between the lower coated area 11a and the display panel 300. On the other hand, the area 22 to which rays of light are applied may be separated by a predetermined distance from the interface between the lower coated area 11a and the display panel 300 depending on the intensity of light generated from the light source 110 or the angel of light incident on a finger 50. FIG. 12 illustrates one light source 110 which is located at an edge of the display panel 300. The area 22 to which rays of light are applied is a partial area of the edge of the display panel 300. Here, the edge of the display panel 300 is a dark band-like area in which there is no pixel and which is visually exposed to the outside. Accordingly, an opening defining the area 22 to which rays of light are applied does not need to be formed in the lower coated area 11a, and is not bound to the color of the lower coated area 11a. In this case, the lower coated area 11a may be formed in a dark color, or the opening may be formed in an area in which manufacturer name or a trademark of the electronic device 10 is printed.

For example, the fingerprint sensor package 100' may further include a touch sensor 23. A general display panel 300 which is used for an electronic device includes a touch panel, and power consumption can increase when the touch panel with a large area is driven in an deactivated state. Accordingly, it is preferable that the touch sensor 23 with smaller power consumption than that of the touch panel be used in a state in which the electronic device is deactivated. The touch sensor 23 whether a finger 50 has been located at the fingerprint acquisition area 30 and outputs a control signal for driving the fingerprint sensor package 100'. A touch sensor driving circuit that drives the touch sensor 23 can be incorporated into the fingerprint sensor package 100' or can be located inside the electronic device.

Figure 13A:
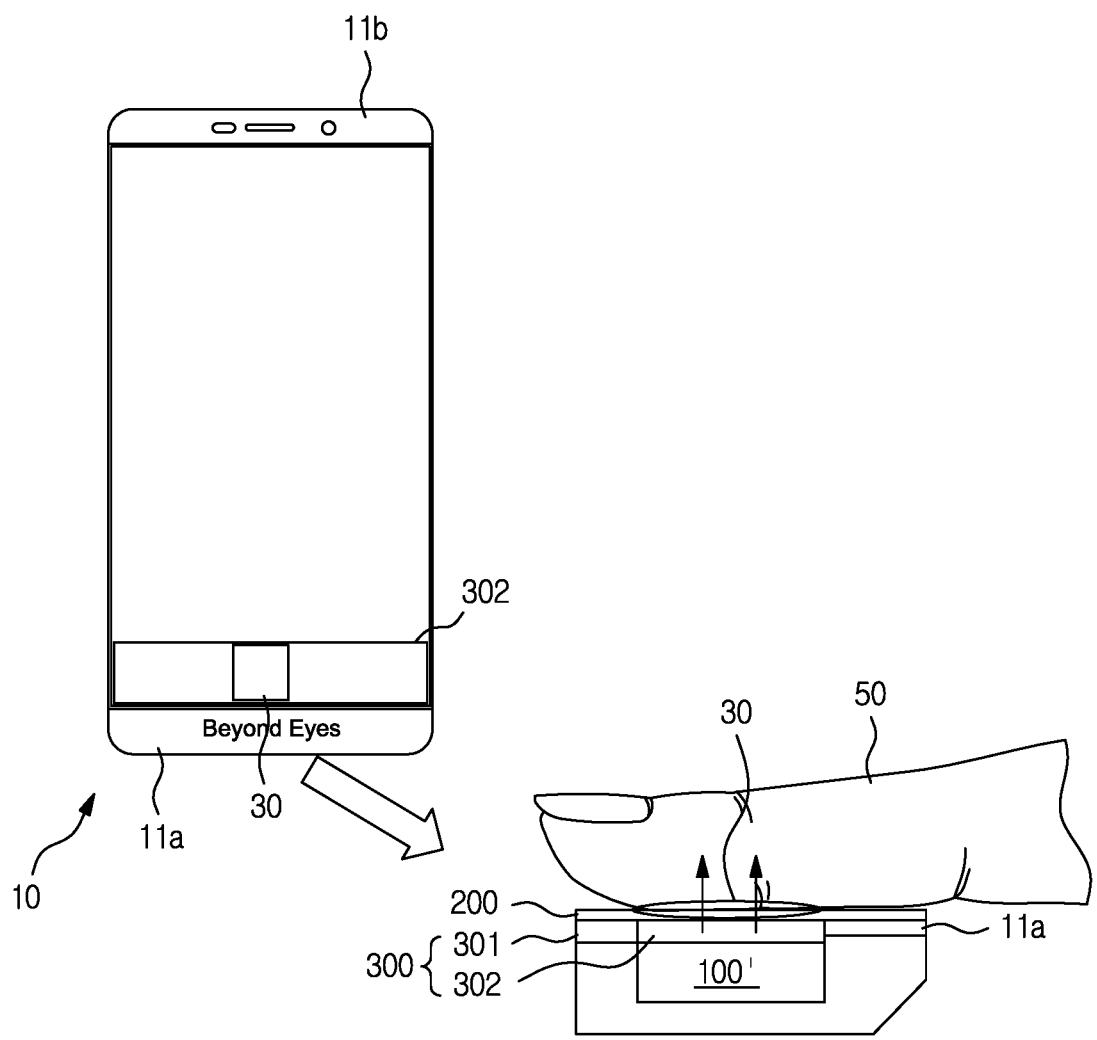
FIGS. 13A and 13B are diagrams schematically illustrating another example of an electronic device to which a fingerprint sensor package is coupled.
Figure 13B:
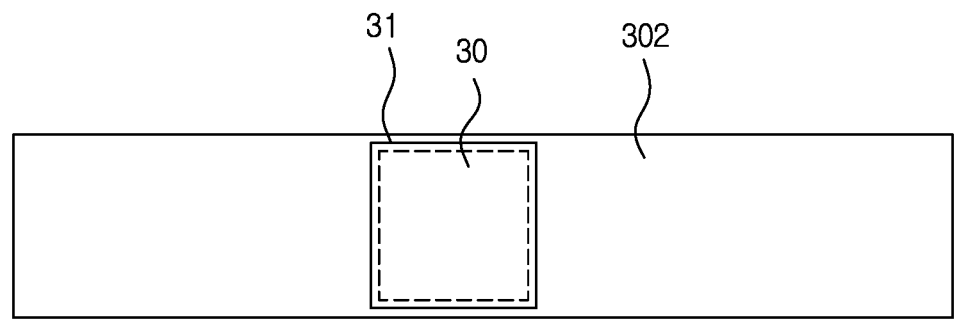

FIGS. 13A and 13B are diagrams schematically illustrating another example of an electronic device to which a fingerprint sensor package is coupled.

In comparison with the display panel 300 illustrated in FIG. 12, a display panel 300 illustrated in FIG. 13A can emit near-infrared rays of light. For example, the display panel 300 illustrated in FIG. 13A includes a first area 301 that emits visible light and a second area 302 that emits both visible light and near-infrared light. Here, the first area 301 and the second area 302 can be formed in the same substrate or can be formed in separate substrates. On the other hand, the first area 301 and the second area 302 can have the same resolution or can have different resolutions. For example, the second area 302 can be implemented with a low resolution such that software keys can be displayed. Since the fingerprint sensor package 100' uses near-infrared light and includes a high-pass filter or a band-pass filter, for example, a home button may be displayed in the fingerprint acquisition area 30 at which a finger is to be located. In this case, only a partial area of the touch sensor corresponding to the second area 302 can be activated to detect whether a finger 50 has been located. For example, all pixels of the display panel 300 may emit both visible light and near-infrared light.

Near-infrared rays emitted from the second area 302 of the display panel 300 or the fingerprint acquisition area 30 are incident on the skin of a finger 50 located on the fingerprint acquisition area 30. The incident near-infrared rays of light serves as point light sources on the surface of the skin of the finger 50 and the ridges and the valleys apply near-infrared rays of light having different incidence angles to the glass cover 200.

A plurality of near-infrared pixels which are arranged in a linear, polygonal (for example, rectangular), or circular shape can be disposed in the second area 302. FIG. 13B is a plan view illustrating pixels 31 arranged in the second area 302. When the fingerprint acquisition area 30 is polygonal or circular, a plurality of near-infrared pixels can be arranged in a band shape on sides of the polygon or the circumference of the circle. Accordingly, when the fingerprint sensor package 100' is seen from above the cover glass 200, the fingerprint acquisition area 30 can coincide with the rectangle constituted by the near-infrared pixels or can be located inside the rectangle. That is, the near-infrared pixels can be disposed such that near-infrared rays of light are emitted at a position at which the near-infrared rays of light can sufficiently diffuse on the skin surface of the finger 50 and they are not disposed on an optical path along which the near-infrared rays of light diffusing on the skin of the finger 50 passes. On the other hand, the distance between the near-infrared pixels and the fingerprint acquisition area 30 can vary depending on the wavelength of a ray of light which is used.

Figure 14:
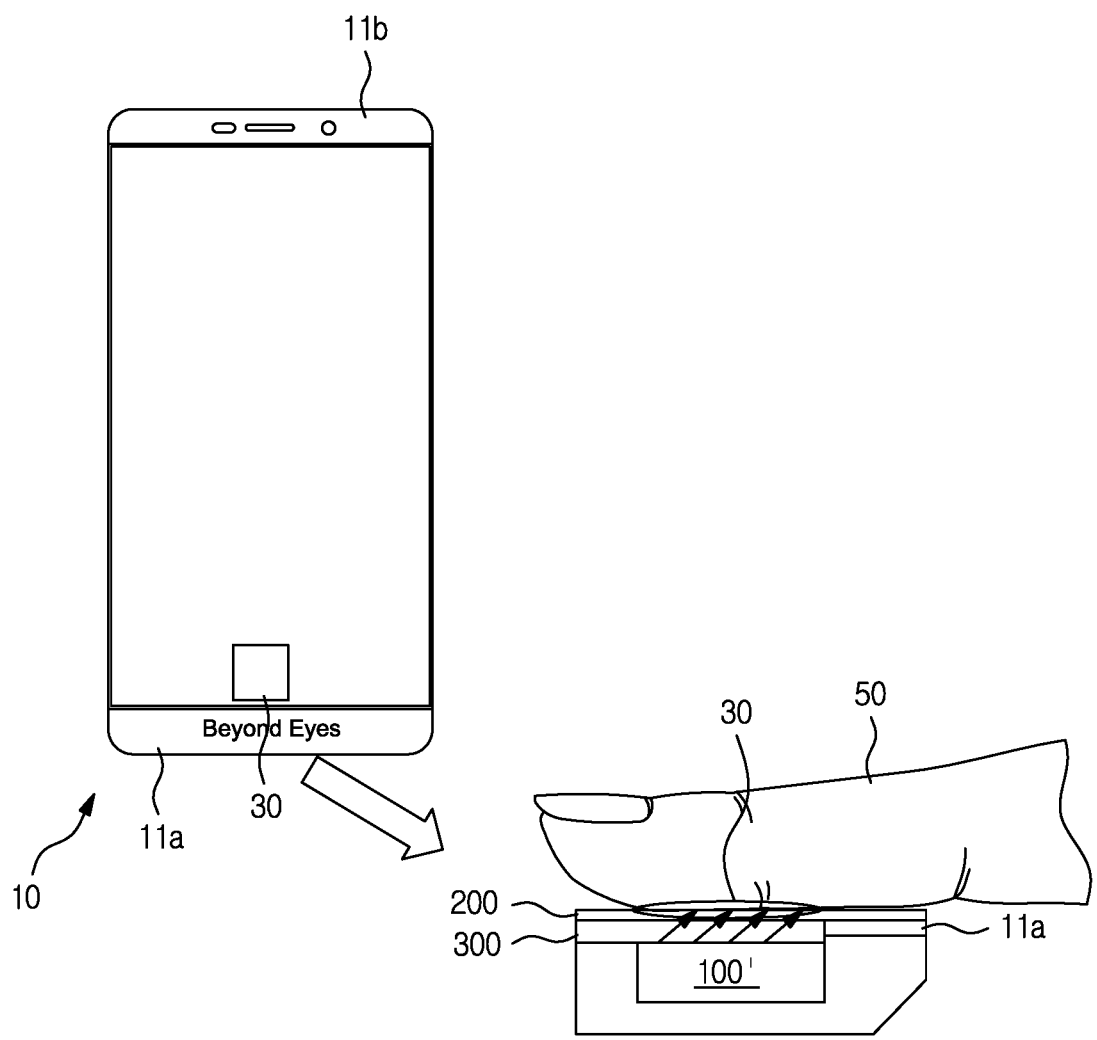
FIG. 14 is a diagram schematically illustrating another example of an electronic device to which a fingerprint sensor package is coupled.

FIG. 14 is a diagram schematically illustrating another example of an electronic device to which a fingerprint sensor package is coupled.

In comparison with the display panel 300 illustrated in FIGS. 13A and 13B, a display panel 300 illustrated in FIG. 14 emits visible light. The display panel 300 emits visible light at various angles. Arrows in FIG. 14 indicate rays of light which are incident on the fingerprint sensor package 100' and used to generate a fingerprint image. Similarly to the system illustrated in FIGS. 3 and 4, rays of light which are incident on the fingerprint sensor package 100' at a detection-target incidence angle out of rays of light emitted from the display panel 300 are totally reflected from the top surface of the glass cover 200.

Figure 15:
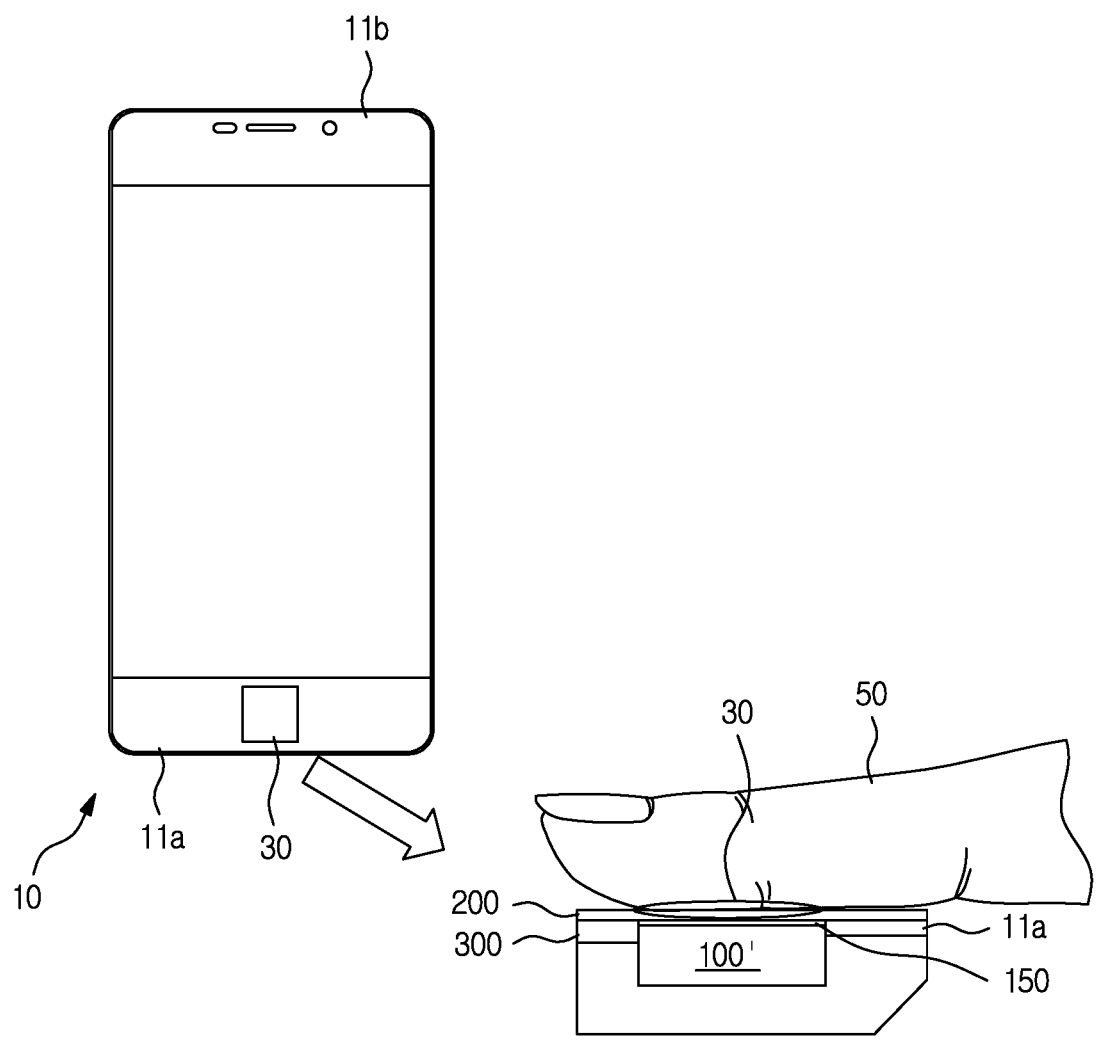
FIG. 15 is a diagram schematically illustrating another example of an electronic device to which a fingerprint sensor package is coupled.

FIG. 15 is a diagram schematically illustrating another example of an electronic device to which a fingerprint sensor package is coupled.

In comparison with the fingerprint sensor package 100' illustrated in FIGS. 12 to 14, a fingerprint sensor package 100' illustrated in FIG. 15 can be in close contact with a glass cover 200 of an electronic device. When a finger comes in contact with the top surface of the glass cover 200, the glass cover 200 provides an optical path along which rays of light applied from ridges and valleys of a fingerprint.

Additionally, a color layer 150 may be disposed between the glass cover 200 and the fingerprint sensor package 100'. A plurality of openings are formed in the color layer 150, and rays of light applied from the glass cover 200 propagates into the fingerprint sensor package 100' through the openings. The plurality of openings can be filled with an optically transparent material. The color layer 150 prevents occurrence of a color difference from the surroundings of the fingerprint sensor package 100' when the fingerprint sensor package 100' is located below the glass cover of the electronic device. The color layer 150 will be described below in detail with reference to FIGS. 16A to 16D.

Additionally, a band-pass filter layer (not illustrated) can be formed on one of the top surface and the bottom surface of the glass cover 200. The band-pass filter layer prevents rays of light, which do not belong to a wavelength band used for generating a fingerprint image, from being incident on the fingerprint sensor package.

FIGS. 16A to 16D are plan views schematically illustrating the color layer.

Figure 16A:
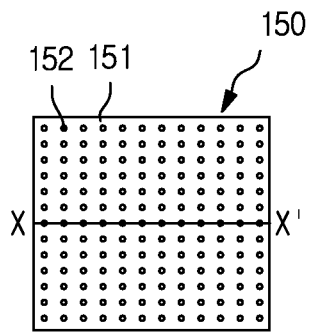
FIGS. 16A to 16D are plan views schematically illustrating the color layer.
Figure 16B:
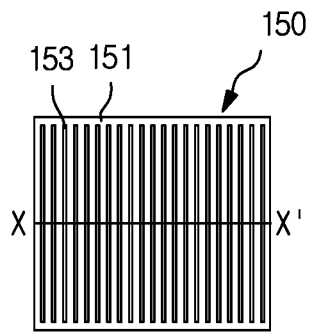
Figure 16C:
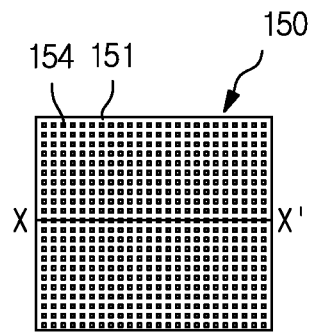

The color layer 150 can be disposed between the display panel 300 and the image sensor layer 100 or between the display panel 300 and the fingerprint sensor package 100'. Referring to FIGS. 16A to 16C, the color layer 150 includes a color manifesting layer 151 which is formed of a material manifesting an arbitrary color, and through-holes 152, 153, and 154 are formed in the color manifesting layer 151. The color manifesting layer 151 can be formed on the top surface of the image sensor layer 100 by deposition or lamination. When the color manifesting layer 151 is formed by deposition, the through-holes 152, 153, and 154 are formed after the color manifesting layer 151 has been deposited. Here, the through-holes 152, 153, and 154 can be filled with an optically transparent material. The optical transparent material is a material that transmits rays of light used to generate a fingerprint image, for example, visible light or near-infrared light. On the other hand, when the color manifesting layer 151 is formed by lamination, the color manifesting layer 151 is formed in a film shape using an optical transparent material by spraying a dye to the top surface of a film. Here, in order to form the through-holes 152, 153, and 154, a mask or a screen can be used or the dye sprayed to parts corresponding to the through-holes 152, 153, and 154 can be removed.

The through-holes 152, 153, and 154 can be formed in various shapes. When seen from above the color layer 150, FIG. 16A illustrates through-holes 152 having a circular shape, FIG. 16B illustrates through-holes 153 having a slit shape, and FIG. 16C illustrates through-holes 154 having a rectangular shape.

Figure 16D:
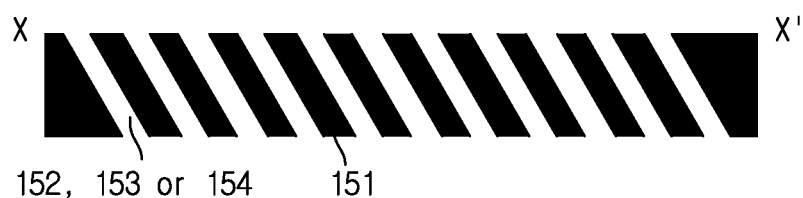

For example, the through-holes 152, 153, and 154 can be formed to have an inclined section. FIG. 16D illustrates a section taken along line X-X' of the color layer 150. The sections of the through-holes 152, 153, and 154 can be formed to be inclined substantially at the same angle as a detection-target incidence angle. By forming the through-holes 152, 153, and 154 such that the section thereof is inclined, a detection-target ray of light can pass therethrough without being blocked, and rays of light other than the detection-target ray of light are blocked. When seen from above the glass cover, entrances of the through-holes 152, 153, and 154 located on the top surface of the color manifesting layer 151 and exits of the through-holes 152, 153, and 154 located on the bottom surface of the color manifesting layer 151 are not located in the same vertical lines and it is thus possible to further decrease a color difference from the surroundings of the fingerprint sensor package.

Figure 17:
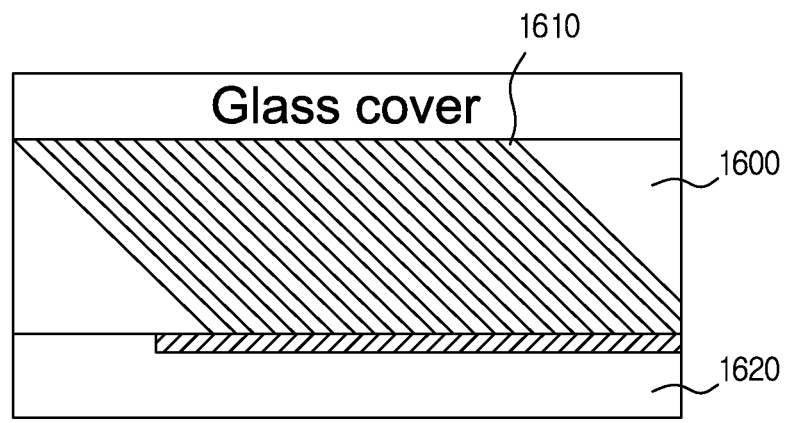
FIG. 17 is a sectional view schematically illustrating another example of a fingerprint sensor package which can be implemented based on the operation principle described above with reference to FIG. 2A.

FIG. 17 is a sectional view schematically illustrating another example of a fingerprint sensor package which can be implemented based on the operation principle described above with reference to FIG. 2A.

Referring to FIG. 17, a fingerprint sensor package 100' includes a light incidence angle filter layer 1600 and an image sensor 1620. FIG. 17 illustrates an example in which the light incidence angle filter layer 1600 is disposed between the glass cover and the image sensor 1620. The light incidence angle filter layer 1600 may be disposed between the bottom surface of the display panel 300 and the image sensor 1620.

A plurality of through-holes 1610 of which a section is inclined are formed in the light incidence angle filter layer 1600. The light incidence angle filter layer 1600 can be formed of a light absorbing material or a material manifesting an arbitrary color. The sections of the through-holes 1610 can be inclined substantially the same angle as a detection-target incidence angle. By forming the through-holes 1610 such that the section thereof is inclined, a detection-target ray of light can pass therethrough without being blocked, and rays of light other than the detection-target ray of light are blocked. When seen from above the glass cover, entrances of the through-holes 1610 located on the top surface of the light incidence angle filter layer 1600 and exits of the through-holes 1610 located on the bottom surface of the light incidence angle filter layer 1600 are not located in the same vertical lines and it is thus possible to further decrease a color difference from the surroundings of the fingerprint sensor package.

The image sensor 1620 is located below the light incidence angle filter layer 1600, and serves to detect a detection-target ray of light passing through the through-holes 1610 and to generate a fingerprint image. For example, the image sensor 1620 can have an optical path inclined along which a detection-target ray of light can pass. The inclined optical path can be formed by a plurality of metal lines. For example, a prism sheet (not illustrated) can be disposed between the light incidence angle filter layer 1600 and the image sensor 1620. As described above with reference to FIGS. 6A to 7B, the prism sheet can refract a detection-target ray of light in a clockwise direction to be incident on the light receiving portion of the image sensor 1620. In this case, a light incidence path of the image sensor 1620 can be formed substantially vertically. The above description of the invention is exemplary, and those skilled in the art can understand that the invention can be modified in other forms without changing the technical concept or the essential feature of the invention. Therefore, it should be understood that the above-mentioned embodiments are exemplary in all respects, but are not definitive.

The scope of the invention is defined by the appended claims, not by the above detailed description, and it should be construed that all changes or modifications derived from the meanings and scope of the claims and equivalent concepts thereof are included in the scope of the invention.

What is claimed is:

1. A display having a fingerprint recognition function, comprising:
 a display panel that is disposed below a glass cover and transmits rays of light having a plurality of incidence angles and indicating ridges and valleys of a fingerprint which is in contact with the glass cover; and
 an image sensor layer that is disposed below the display panel, detects a detection-target ray of light from the rays of light having a plurality of incidence angles, and generate a fingerprint image;
 wherein the image sensor layer includes:
  a light selection structure configured for selecting the detection-target ray of light having a detection-target incidence angle from the rays of light having a plurality of incidence angles, wherein the detection-target incidence angle is an angle which can be taken by rays of light generated from the ridges of the fingerprint but not by rays of light generated from the valleys of the fingerprint, wherein the light selection structure includes:
   a prism sheet that refracts the ray of light having a detection-target incidence angle from the rays of light having a plurality of incidence angles at a first angle, and
   a microlens disposed below the prism sheet to refract the ray of light refracted at the first angle at a second angle; and
  an image sensor that is disposed below the light selection structure and generates the fingerprint image using the detection-target ray of light, wherein the image sensor includes a light receiving portion that generates a pixel current corresponding to the ray of light refracted at the second angle, and wherein the light receiving portion is disposed on one side below the microlens;
 wherein the display panel serves as a light source of the rays of light having a plurality of incidence angles.

2. The display according to claim 1, wherein the image sensor generates a plurality of sub fingerprint images, and
 wherein the display panel generates the rays of light having a plurality of incidence angles by sequentially turning on pixels in one direction.

3. The display according to claim 1, wherein the image sensor generates the finger print image, and
 wherein the display panel generates the rays of light having a plurality of incidence angles by simultaneously turning on pixels.

4. The display according to claim 1, wherein the prism sheet includes a plurality of first inclined surfaces and a plurality of second inclined surfaces that are alternately arranged to form a prism ridge and a prism valley,
 wherein the first inclined surfaces refract the ray of light having a detection-target incidence angle from the rays of light having a plurality of incidence angles at a first angle, and
 wherein an inclination angle of the first inclined surfaces is smaller than an inclination angle of the second inclined surfaces.

5. The display according to claim 4, further comprising a light absorbing layer that is formed on the second inclined surfaces and absorbs incident rays of light.

6. The display according to claim 1, further comprising a light absorbing layer that is formed between two microlenses and absorbs incident rays of light.

7. The display according to claim 1, wherein the image sensor is formed of thin-film transistors and the image sensor layer is formed in at least a part or the whole of a bottom surface of the display panel.

8. A fingerprint sensor package that is disposed below a display panel and generates a fingerprint image, comprising:
- a light selection structure configured for selecting a detection-target incidence angle which is able to be taken by only near-infrared rays of light reflected from ridges from a plurality of incidence angles, near-infrared rays of light reflected from ridges and valleys of a fingerprint formed on a finger skin, the near-infrared rays of light having the plurality of incidence angles, wherein the light selection structure includes:
  - a prism sheet that refracts the ray of light having a detection-target incidence angle from the rays of light having a plurality of incidence angles at a first angle, and
  - a microlens disposed below the prism sheet to refract the ray of light refracted at the first angle at a second angle; and
- an image sensor that is disposed below the light selection structure and generates a fingerprint image using the near-infrared ray of light having the detection-target incidence angle selected by the light selection structure, wherein the image sensor includes a light receiving portion that generates a pixel current corresponding to the ray of light refracted at the second angle, and wherein the light receiving portion is disposed on one side below the microlens.

9. A fingerprint sensor package that is disposed below a display panel and generates a fingerprint image, comprising:
- a light selection structure configured for selecting a ray of light having a detection-target incidence angle from rays of light having a plurality of incidence angles and indicating ridges and valleys of a fingerprint, wherein the light selection structure includes:
  - a prism sheet that refracts the ray of light having a detection-target incidence angle from the rays of light having a plurality of incidence angles at a first angle, and
  - a microlens disposed below the prism sheet to refract the ray of light refracted at the first angle at a second angle; and
- an image sensor that is disposed below the light selection structure and generates a fingerprint image using the ray of light selected by the light selection structure, wherein the image sensor includes a light receiving portion that generates a pixel current corresponding to the ray of light refracted at the second angle, and wherein the light receiving portion is disposed on one side below the microlens,
- wherein the fingerprint sensor package is disposed below the display panel and the rays of light having the plurality of incidence angles are generated by the display panel.

\* \* \* \* \*